(12) United States Patent
Tashiro et al.

(10) Patent No.: US 6,901,747 B2
(45) Date of Patent: Jun. 7, 2005

(54) FUEL INJECTION CONTROL METHOD FOR DIESEL ENGINE AND REGENERATIVE CONTROL METHOD FOR EXHAUST GAS AFTER TREATMENT DEVICE

(75) Inventors: Yoshihisa Tashiro, Fujisawa (JP); Takehito Imai, Fujisawa (JP); Tsuneo Suzuki, Fujisawa (JP); Naofumi Ochi, Fujisawa (JP); Masashi Gabe, Fujisawa (JP)

(73) Assignee: Isuzu Motors Limited, Toyko (JP)

( * ) Notice: Subject to any disclaimer, the term of this patent is extended or adjusted under 35 U.S.C. 154(b) by 0 days.

(21) Appl. No.: 10/343,445
(22) PCT Filed: Feb. 20, 2002
(86) PCT No.: PCT/JP02/01438
§ 371 (c)(1),
(2), (4) Date: Jan. 31, 2003
(87) PCT Pub. No.: WO02/066813
PCT Pub. Date: Aug. 29, 2002

(65) Prior Publication Data
US 2003/0145581 A1 Aug. 7, 2003

(30) Foreign Application Priority Data
Feb. 20, 2001 (JP) .......................................... 2001-42778
Mar. 7, 2001 (JP) .......................................... 2001-62851
Mar. 26, 2001 (JP) .......................................... 2001-86722

(51) Int. Cl.[7] ................................................ F01N 3/00
(52) U.S. Cl. ............................ 60/286; 60/274; 60/276; 60/284; 60/285; 123/299
(58) Field of Search .................... 60/274, 284, 285, 60/286, 295, 297, 303, 276; 123/295, 299, 300

(56) References Cited

U.S. PATENT DOCUMENTS

| 4,685,290 A | | 8/1987 | Kamiya et al. |
| 5,479,775 A | | 1/1996 | Kraemer et al. |
| 5,960,627 A | * | 10/1999 | Krampe et al. ............... 60/274 |
| 5,975,046 A | * | 11/1999 | Kaneko et al. ............. 123/300 |
| 5,983,630 A | * | 11/1999 | Kibe et al. ..................... 60/285 |

(Continued)

FOREIGN PATENT DOCUMENTS

| EP | 0 980 973 A2 | 2/2000 |
| EP | 1 026 385 A2 | 8/2000 |

(Continued)

OTHER PUBLICATIONS

Supplemental EP Search Report for corresponding EP Application 02 70 0605 mailed Oct. 7, 2004.

Primary Examiner—Tu M. Nguyen
(74) Attorney, Agent, or Firm—Staas & Halsey LLP

(57) ABSTRACT

The present invention concerns an diesel engine fuel injection control, and a regeneration control method of exhaust gas post-treatment apparatus using this fuel injection control, and the engine fuel injection control for performing after injections (Fas, Fam) after a main injection (Fm) for activation and regeneration of the exhaust gas post-treatment apparatus, through the rising of diesel engine exhaust gas temperature or the decrease of the oxygen concentration in the exhaust gas, is composed to perform the after injections (Fas, Fam) in a range of 40° ATDC to 90° ATDC of the crank angle.

Whereby, the main injection can be burned, without misfire, even when the main injection is largely retarded, or, the injection quantity is increased/decreased, and the engine operation can be sustained, by keeping the engine combustion in a good state.

3 Claims, 15 Drawing Sheets

U.S. PATENT DOCUMENTS

| | | | | |
|---|---|---|---|---|
| 6,082,325 | A | * | 7/2000 | Digeser et al. .............. 123/299 |
| 6,240,721 | B1 | * | 6/2001 | Ito et al. ........................ 60/274 |
| 6,378,297 | B1 | * | 4/2002 | Ito et al. ........................ 60/284 |
| 6,378,487 | B1 | * | 4/2002 | Zukouski et al. ........... 123/299 |
| 6,412,276 | B1 | * | 7/2002 | Salvat et al. .................. 60/295 |
| 6,536,209 | B2 | * | 3/2003 | Fluga et al. ................... 60/284 |
| 6,666,020 | B2 | * | 12/2003 | Tonetti et al. ................ 60/286 |

FOREIGN PATENT DOCUMENTS

| | | |
|---|---|---|
| EP | 1035314 | 9/2000 |
| EP | 1 035 314 A2 | 9/2000 |
| EP | 1 122 417 A2 | 8/2001 |
| JP | 7-189653 | 7/1995 |
| JP | 8-319820 | 12/1996 |
| JP | 10-89054 | 4/1998 |
| JP | 2000-110646 | 4/2000 |
| JP | 2000-161110 | 6/2000 |
| JP | 2000-297682 | 10/2000 |
| JP | 2000-303892 | 10/2000 |
| JP | 2001-214782 | 8/2001 |
| JP | 2002-38990 | 2/2002 |
| JP | 2002-129938 | 5/2002 |

* cited by examiner

[ Relation between the injection timing of the after injection and the exhaust gas temperature ]

[ Relation between the injection timing of the sub after injection and the main after injection and the exhaust gas temperature ]

(In the case of fixing the injection timing of the sub after injection and changing the injection timing of the main after injection)

(a)

(b)

(c)

FUEL INJECTION CONTROL METHOD FOR DIESEL ENGINE AND REGENERATIVE CONTROL METHOD FOR EXHAUST GAS AFTER TREATMENT DEVICE

BACKGROUND OF THE INVENTION

1. Field of the Invention

The present invention concerns a fuel injection control method for diesel engine and a regeneration control method of exhaust post-treatment apparatus.

More precisely, it concerns an engine fuel injection control method for exhaust gas temperature rising of a diesel engine or for oxygen decrease in the exhaust gas, and a regeneration control method on an exhaust gas post-treatment apparatus such as continuous regeneration type diesel particulate filter system of the like for purifying the exhaust gas by trapping particulate matter, using these fuel injection control methods.

2. Detailed Description of the Prior Art

In the recent fuel injection control technology, as shown in FIG. 14($a$), a multistage injection technology has been developed actively by increasing the number of injections, in order to retard the rising of the injection quantity when starting the fuel injection, because, in the accumulator type fuel injection apparatus of the like, in the course of main injection, the amount of emission of nitrogen oxides (NOx hereinafter) or particulate matter (PM: particulate: PM hereinafter) increases, if it is injected at once, as the rate of injection in respect to the crank angle is high from the beginning, the amount of fuel to be injected into the combustion chamber increases suddenly, and the fuel blows in at a stretch.

Besides, a fuel injection control technology has been developed for performing an after injection with a small interval after the main injection, and accelerating the mixture of fuel injected in the main injection and sucked air, by intermediated of the energy of this after injection, as shown in FIG. 14($b$), in order to early terminate the combustion of fuel of the main injection and thereby reduce PM.

In addition, the fuel injection mode control method of Japanese patent application Kokai publication No. 2000-97077 proposes to improve the ignitionability of the fuel injection, by adopting a multistage injection mode for performing a multistage pilot injection, as shown in FIG. 14($c$), during the engine start.

These fuel injection control technologies aim at reducing the emission of NOx and PM, terminating the fuel combustion rapidly, and converting the thermal energy into engine output as much as possible, as a result, the exhaust gas temperature lowers.

On the other hand, as for the diesel engine, in recent years, an exhaust gas post treatment apparatus provided with oxide catalyst and NOx catalyst for elimination of hazardous constituents such as PM, NOx, SOx and others emitted from the engine and further a diesel particulate filter (DPF for Diesel Particulate Filter: PDF hereinafter) for catching PM is arranged in an exhaust passage.

The filter for directly catching this PM includes ceramic monolithic honeycomb shape wall flow type filters, fiber shape type filters where ceramics or metals are formed into fiber, or others, and the exhaust gas purification apparatus using these DPF are installed in the middle of the engine exhaust pipe, cleans and emits the exhaust gas.

However, this filter for catching PM is clogged along the trap of PM, and the exhaust gas pressure (exhaust gas pressure) rises as the trapped amount of PM increases, it is required thereby to eliminate PM from this DPF, and therefore, several methods and systems have been developed.

Among them, there is a system for eliminating PM by combustion through the heating of the filter with an electric heater or a burner, or back washing by flowing the air in the opposite direction; however, in the case of these systems, the fuel efficiency deteriorates, because PM is burned by supplying heating energy from outside, and the regeneration control is difficult.

In addition, in the case of adopting these systems, often two lines of exhaust passage provided with DPF are installed, PM trap and filter regeneration are repeated alternately, thereby tending to increase the size and cost of the system.

In order to cope with these problems, a continuous regeneration type DPF system as shown in FIGS. 15 to 17 have been proposed.

FIG. 15 shows an example of continuous regeneration type DPF system ($NO_2$ regeneration type DPF system) by intermediate of nitrogen dioxide ($NO_2$, hereinafter), and this continuous regeneration type DPF system 1A is composed of a wall flow type filter 3Ab and a oxidation catalyst 3Aa disposed upstream thereof. This upstream side oxidation catalyst 3Aa carrying platinum or the like oxidizes nitrogen monoxide (NO, hereinafter) in the exhaust gas to obtain $NO_2$ ($2NO+O_2 \rightarrow 2 NO_2$) and this $NO_2$ oxidizes PM caught by the downstream side filter 3Aa to obtain, carbon dioxide ($CO_2$, hereinafter) ($2 NO_2+C \rightarrow 2NO+CO_2$) removing thereby PM.

Such this oxidation of PM by $NO_2$ is performed with less energy barrier and at a lower temperature than the oxidation of PM by oxygen ($O_2$, hereinafter), and thereby, with a reduced external energy supply, the filter can be regenerated by removing PM through oxidation, all the way trapping PM continuously by using thermal energy in the exhaust gas.

Besides, the continuous regeneration type DPF system (integrated $NO_2$ regeneration type DPF system) 1B shown in FIG. 16 is an improvement of the system 1A shown in FIG. 15, in which oxidation catalyst 32A is applied on the wall surface of a filter 3B provide with wall flow type catalyst, and the oxidation of NO in the exhaust gas and the oxidation of PM by $NO_2$ are performed on this wall surface. Thereby, the system is simplified.

Then, the continuous regeneration type DPF system (DPF system provided with PM oxidation catalyst) 1C shown in FIG. 17 applies precious metal oxidation catalyst 32A such as platinum (Pt) or the like and PM oxidation catalyst 32B to the wall surface of a filter 3C provide with wall flow type PM oxidation catalyst, and the oxidation of PM is performed on this wall surface from a lower temperature.

This PM oxidation catalyst 32B is a catalyst for direct PM oxidation by means of $O_2$ in the exhaust gas, composed of cerium dioxide ($CeO_2$) or the like.

For this continuous regeneration type DPF system 1C, PM is oxidized by $NO_2$ using mainly a reaction of the oxidation catalyst 32A to oxidize NO to $NO_2$ in a low temperature oxidation range (about 350° C. to 450° C.), PM is oxidized by a reaction of the PM oxidation catalyst 32B to oxidize directly PM by means of $O_2$ in the exhaust gas ($4CeO_2+C \rightarrow 2Ce_2O_3+CO_2$, $2Ce_2O_3+O_2 \rightarrow 4Ce\ O_2$ or others) in a middle temperature oxidation range (about 400° C. to 600° C.), while PM is oxidized by $O_2$ in the exhaust gas in a high temperature oxidation range (600° C. or more) higher than the temperature of PM combustion by $O_2$ in the exhaust gas.

These continuous regeneration type DPF systems oxidize and eliminate PM while catching PM, by lowering PM oxidation temperature through the use of PM oxidation by catalyst or nitrogen dioxide.

However, even in these continuous regeneration type DPF systems, it is still necessary to rise the exhaust gas temperature to the order of 350° C., and the aforementioned reaction does not occur, and the filter can not be regenerated by PM oxidation in an engine operation state with a low exhaust gas temperature such as idling operation, extremely low load operation or the like, and PM continues to be accumulated in the filter, causing the problem of filter clogging.

For instance, in the idling operation, low speed or extremely low load operation when the engine break is operated on the downhill, the fuel is burned scarcely, a low temperature exhaust gas flows into the continuous regeneration type DPF apparatus, lowering the catalyst temperature and deteriorating the catalyst activity.

If the idling or extremely low load engine operation is sustained, PM trap progresses without supply of a hot exhaust gas that can oxidize and eliminate PM; therefore, PM can not be oxidized and eliminated while PM trap continues, resulting in the progress of filter clogging.

This progress of filter clogging increases the exhaust gas pressure and deteriorates the fuel efficiency and, moreover, when the exhaust gas pressure rises excessively along with the progress of filter clogging, the engine will stop, and if things come to the worst, it will develop to the disability of restart.

Especially, in the case of using a vehicle loaded with this continuous regeneration type DPF system for a home delivery service or the like dominated by urban area traveling, the engine runs mainly with a low exhaust gas temperature; therefore, it is often necessary to control in order to rise the exhaust gas temperature.

Therefore, it is planned to rise the exhaust gas temperature by retarding the injection timing, in the engine fuel injection; however, a misfire of injected fuel may be provoked if it is tried to rise the exhaust gas temperature by retarding considerably the injection timing, a limit occurs in the injection timing retarding angle, leading to the occurrence of a limit for the exhaust gas temperature rising, and the range of possible temperature rising comes to be reduced.

In addition to the regeneration of the filter for burning and eliminating PM caught in the aforementioned DPF, it comes to be required to rise, even momentarily, the exhaust gas temperature without increasing the engine output, or to generate temporally an exhaust gas of reducing atmosphere by reducing the oxygen concentration in the exhaust gas to almost zero, in order to activate by increasing the temperature of oxidation catalyst and NOx catalyst used for exhaust gas countermeasures, or to regenerate the occlusion substance of NOx occlusion reduction type catalyst.

In short, even temporally, a fuel injection control contrary, as the result, to the fuel injection control for lowering the exhaust gas temperature, by burning the fuel injected into the combustion chamber as soon as possible for increasing the engine output, as required in the prior art, comes to be required.

As one of methods for increasing the exhaust gas temperature and lowering the oxygen concentration, there is a method for retarding (delay) the main injection. In this retard of main injection, the more the timing is retarded, in short, the larger is the retard amount, the less the energy of the injected fuel is concerted in the engine output, and the more rises the exhaust gas temperature. Moreover, oxygen concentration in the exhaust gas can be reduced by increasing the fuel injection amount during the main injection.

In this retard of main injection, as the main injection which is generally performed neat the top dead center (TDC) is retarded, the pressure and temperature lower along with the distance from the TDC, only with the main injection, making the ignitionability difficult; in order to avoid this problem, a pilot injection is made near the TDC where the pressure and temperature are high, this fuel is burned to secure a kindling charcoal, so that the fuel of the main injection burns securely.

Nevertheless, concerning this main injection retard, there are problems of misfire, deterioration in output torque and fuel efficiency as explained below.

Concerning the misfire, it comes to be demanded to prolong the combustion time as long as possible, by increasing the interval between the pilot injection and the main injection that was not required for the prior art, in the retard of main injection, and misfire occurs if it is intended to increase the retard amount of the main injection, simply by an injection control only with the pilot injection and the retard of main injection, to meet with this demand.

Moreover, there is a case where the injection quantity is reduced in order to intend to optimize the main injection quantity in respect to the required exhaust gas temperature, in order to improve the fuel efficiency, the kindling charcoal becomes insufficient and flames off if the pilot injection quantity of that moment is constant.

Because of these problems of misfire, a limit is developed in the rising of exhaust gas temperature, and, the decrease of the oxygen concentration becomes unable to be achieved.

Also, as for torque output, when this retard control of main injection is performed, the engine output torque lowers as the combustion of the main injection is delayed, making impossible to maintain a high output torque, so there is a problem that this retard control of main injection can not be used in the case of desiring to maintain an output torque.

There, concerning the retard operation of this main injection, Japanese Patent Application No. 2000-291462 performs an auxiliary injection only once (second injection pattern), when the injection timing of the main injection is retarded largely, for increasing the exhaust temperature, and thereby the misfire is prevented.

However, if it is tried to maintain a combustion flame until the timing when the main injection is injected, only by a single sub injection, it becomes necessary to increase the fuel injection quantity in this sub injection, causing the problem of fuel efficiency deterioration.

At the same time, torque is generated by this sub injection, deteriorating the drivability. Moreover, a single sub injection limits the retard amount of the main injection, and the rising range of exhaust temperature will be reduced disadvantageously.

SUMMARY OF THE INVENTION

The present invention has been devised in order to resolve the aforementioned problems and has an object to provide a diesel engine fuel injection control method allowing to activate and regenerate the exhaust gas post-treatment apparatus, by increasing the exhaust gas temperature or lowering the oxygen concentration in the exhaust gas, through the fuel injection control, in the fuel injection of a diesel engine.

Another object is to provide a regeneration method for continuous regeneration type DPF system, allowing to rise the exhaust gas temperature, oxidize and eliminate PM, through the engine fuel injection control, even during an engine operation state with a low exhaust gas temperature such as idling operation, extremely low load operation or the like, in a continuous regeneration type DPF system.

The diesel engine fuel injection control method for achieving the aforementioned objects is a fuel injection control for performing an after injection after the main injection, composed as follows.

1) A diesel engine fuel injection control for performing an after injection after the main injection for at least one of rising of diesel engine exhaust gas temperature and decrease of the oxygen concentration in the exhaust gas, in which the after injection is performed in a range of 40° ATDC to 90° ATDC of the crank angle.

In short, the exhaust gas temperature is risen by trailing the combustion and taking the combustion heat into the exhaust gas, through the execution of after injection with an ATDC crank angle larger than the normal after injection, corresponding to the range of 40° to 90° obtained experimentally in terms of crank angle after the passage of the top dead center TDC (ATDC).

The exhaust gas temperature can be risen by performing this after injection after the main injection, and also, the oxygen concentration in the exhaust gas can be lowered.

Consequently, in an exhaust gas post-treatment apparatus to be disposed on the lower side of this diesel engine, oxidation catalyst and NOx catalyst can be activated or regenerated, and the filter can be regenerated by burning and eliminating PM trapped by the DPF.

2) The aforementioned diesel engine fuel injection control method, in which the after injection is performed by a multistage injection of sub after injection and main after injection and, at the same time, the sub after injection is performed in a range of 40° ATDC to 70° ATDC of the crank angle and the main after injection in a range of 70° ATDC to 90° ATDC of the crank angle.

By inserting a sub after injection between this main injection and a main after injection and performing in a sub after injection range of 40° to 70° and a main after injection range of 70° to 90°, the kindling fire can be maintained until the main after injection and the main after injection can be burned without misfire, even when the timing of main after injection is largely retarded than the top dead center TDC, permitting to create an exhaust gas state necessary for regeneration of catalyst or others. These ranges are obtained experimentally.

3) The aforementioned diesel engine fuel injection control method, in which the main after injection is performed by calculating the injection quantity and the injection timing of the main after injection according to the relation of the injection quantity and the injection timing of the main after injection in respective operation states of an engine, determined previously.

The injection data of this main after injection includes, for example, map data MVam (Q,Ne), MTam (Q, Ne) in respect of torque Q and engine speed Ne indicating respective operation states of an engine, or others, determined preliminarily by experiment or computation, and input previously into a control apparatus for performing this injection control.

According to this composition, an appropriate main after injection can be realized by a relatively simple algorism, because the after injection control can be performed by selecting appropriate injection quantity and injection timing of the main after injection.

4) The aforementioned diesel engine fuel injection control method, in which the sub after injection is performed by calculating the injection quantity and the injection timing of the sub after injection according to the relation of the injection quantity and the injection timing of the sub after injection in respective operation states of an engine, determined previously.

The data of injection quantity and injection timing of this sub after injection includes, for example, map data MVas (Q,Ne), MTas (Q, Ne) in respect of torque Q and engine speed Ne indicating respective operation states of an engine, or others, similarly to the data of injection quantity and injection timing of the main after injection, determined preliminarily by experiment or computation, and input previously into a control apparatus for performing this injection control.

It should be noted that information data whether to perform or not the sub after injection can be included by setting MVas (Q, Ne)=0 in the range without sub after injection, and in the case of setting all to zero, the after injection control is set to not to perform the sub after injection.

According to this composition, the fuel of the main after injection can be burned efficiently, all the way saving the fuel, by a relatively simple algorithm, because the after injection control can be performed by selecting appropriate injection quantity and injection timing of the sub after injection.

5) The diesel engine fuel injection control method, in which it is determined whether to perform or not the sub after injection, based on the output values of a fuel combustion state detection means, all the way monitoring the fuel combustion state in the engine combustion chamber by the fuel combustion state detection means, and the sub after injection is performed based on the determination.

As for this fuel combustion state detection means for monitoring the fuel combustion state in the engine combustion chamber, there is an ion gap sensor. This ion gap sensor uses the generation of electrons by the combustion of a fuel, such as HC or others and can monitor the combustion state as electric resistance variation, by applying a voltage of about 50 to 200V to a conductive portion facing to the inside of the combustion chamber and separated by an appropriate interval (for instance, about 1 mm) and take the generation of electron by this combustion as electric resistance variation, by detecting the electric resistance variation of this conductive portion.

In short, when the fuel of main injection has burned out and the fuel of main after injection does not ignites, the ion concentration decreases and the resistance increases when the fuel of main injection burns out, it will be enough to perform the sub after injection by detecting this resistance variation, and in case where the ion concentration is high and the resistance decreases, the sub after injection shall not be performed.

According to this composition, the main after injection can be burned, securely, because it is determined whether to perform or not the sub after injection, by monitoring the fuel combustion state in the combustion chamber.

6) The diesel engine fuel injection control method, in which at least one of injection quantity and injection timing of the sub after injection is adjusted and controlled, based on the output values of a fuel combustion state detection means, all the way monitoring the fuel combustion state in the engine combustion chamber by the fuel combustion state detection means.

In short, the feedback control is realized by taking the output of the ion gap sensor which is a fuel combustion state detection means as desired value and at least one of injection quantity and injection timing of the sub after injection as control variable.

According to this composition, the main after injection can be burned by performing an optimal sub after injection control, and it becomes possible to realize the after injection control, all the way limiting the fuel consumption to the strict minimum.

In addition, for the diesel engine fuel injection control method to achieve the object, the relation between the pilot injection and the main injection is composed as follows.

7) A diesel engine fuel injection control method for performing a pilot injection and a main injection by controlling the fuel injection of a diesel engine, and for performing at least one engine fuel combustion among retard of the main injection or increase/decrease of the injection quantity, for at least one of rising of diesel engine exhaust gas temperature and decrease of the oxygen concentration in the exhaust gas, in which the injection quantity of the pilot injection is increased/decreased, in accordance with the increase/decrease of retard amount and injection quantity of the main injection.

The increase/decrease of retard amount and injection quantity of this main injection is not constant for a normal operation, but shall be performed for rising the exhaust gas temperature without increasing the engine output, or for enriching the exhaust gas composition, only during the activation of oxidation catalyst of the exhaust gas post-treatment apparatus, or the regeneration treatment of NOx catalyst or DPF filter.

There, the main injection can be burned without misfire, even when the main injection is injected with a large retard amount, by the increase/decrease of injection quantity in the pilot injection, in accordance with the increase/decrease of retard amount of this main injection, allowing to secure an exhaust gas composition and a temperature necessary for catalyst regeneration or others.

In addition, the main injection can be burned without misfire, even when the injection quantity of main injection is reduced, by the increase/decrease of injection quantity in the pilot injection, in accordance with the increase/decrease of injection quantity of this main injection, allowing to secure an exhaust gas composition and a temperature necessary for catalyst regeneration or others.

8) The aforementioned diesel engine fuel injection control method, in which the injection quantity of the pilot injection is calculated in accordance with the relation between at least one quantity among the retard amount or the injection quantity of the main injection obtained previously and the injection quantity of the pilot injection.

According to this composition, the injection quantity of the pilot injection can be increased/decreased in accordance with the retard amount, injection quantity of the main injection by a relatively simple algorism, because it increases/decreases in accordance with the retard amount, injection quantity of the main injection, according to a relation determined preliminarily by experiment or others.

In addition, as the injection quantity of the pilot injection increases/decreases in accordance with the retard amount, injection quantity of the main injection, the fuel will not be consumed unnecessarily allowing to save the fuel compared to the case of simple increase of the pilot injection quantity, and the increase of fuel consumption can be limited to the minimum.

It should be noted that this increase/decrease quantity can not be determined uniformly and can be obtained by experiment for respective kind of engines, because the injection quantity of the pilot injection increases along with the increase of the retard amount of the main injection, and the injection quantity of the pilot injection decreases along with the increase of the injection quantity of the main injection, but the actual increase/decrease quantity varies according to the kind of engine, or others.

9) Or, the diesel engine fuel injection control method, in which the injection quantity of the pilot injection is increased/decreased based on the output value of a fuel combustion state detection means, all the way monitoring the fuel combustion state in the engine combustion chamber by the fuel combustion state detection means, when al least one of the retard amount and the injection quantity of the main injection shall be increased/decreased.

As for this fuel combustion state detection means for monitoring the fuel combustion state in the engine combustion chamber, the aforementioned ion gap sensor can be used, and the pilot injection can be performed with an optimal injection quantity through the feedback control, by taking the output (current value) of this ion gap sensor as desired value, and the injection quantity of the pilot injection as control variable.

Consequently, the main injection can be burned securely with a strict minimum necessary injection quantity of the pilot injection. Besides, it becomes unnecessary to determine the relation between the retard amount, injection quantity of the main injection and the injection quantity of the pilot injection, preliminarily, by experiment or others.

Also, the diesel engine fuel injection control method for achieving the object is composed as follows, including the retard of the main injection and twice or more sub injections.

10) It is composed to retard the injection timing of the main injection and, at the same time, perform the sub injection twice or more at a timing before the injection timing of the main injection, in order to rise the exhaust temperature of a diesel engine, the first injection of the sub injection is performed at a timing allowing the ignitionability, and the combustion flame is sustained until the injection timing of the main injection, by the second and following injections of the sub injection.

11) Then, the injection timing of the main injection is set to 25° ATDC to 45° ATDC, so that a hotter exhaust gas can be obtained, by this diesel engine fuel injection control method. The exhaust temperature can be risen considerably (for instance, about 200° C.), by this considerable retard of the injection timing of the main injection.

This injection timing of the main injection, 25° ATDC, is the lower limit value where the effect of the multistage auxiliary injection can be deployed, while the upper limit value 45° ATDC is a boundary where the substantial effect begins to be abated in view of the fuel efficiency.

12) And, concerning the sub injection of this diesel engine fuel injection control method, the exhaust temperature can be risen without increasing the torque, and the variation due to the torque generated in the normal operation (operation for generating desired engine speed and torque, without considering specifically the exhaust temperature) can be suppressed, by increasing consecutively the fuel injection quantity of the sub injection of retarded injection timing more than the fuel injection quantity of the sub injection of an earlier injection timing.

The relation between the number of times, injection timing, and injection quantity of this sub injection, the retard amount of the injection timing of the main injection, and the rising amount of the exhaust temperature can be determined by experiment, the data obtained by this experiment are stored in a fuel injection control apparatus in the form of map date or the like, and this fuel injection control can be performed easily, by determining the injection control value of the sub injection and the main injection from this data, as necessary, when this fuel injection control is performed.

Consequently, according to this diesel engine fuel injection control method, the main injection can be retarded considerably and the exhaust temperature can be risen considerably, because the combustion flame in the cylinder can be maintained, all the way generating a generation torque identical to the torque generated in the normal operation, by suppressing the generation of torque variation, through the control of the injection quantity and the injection timing of multiple times of sub injections.

Then, the aforementioned fuel injection control method can be used by integrating into a regeneration control method of an exhaust gas post-treatment apparatus such as continuous regeneration type DPF system.

The regeneration control method of exhaust gas post-treatment apparatus is composed by including the aforementioned diesel engine fuel injection control method in the regeneration control to be performed for regeneration treatment of an exhaust gas post-treatment apparatus, in the exhaust gas post-treatment apparatus for excluding hazardous constituent in the engine exhaust gas.

According to this regeneration control method, the exhaust gas post-treatment apparatus can be activated or regenerated by increasing the exhaust gas temperature, or decreasing the oxygen concentration in the exhaust gas, during the regeneration of oxidation catalyst, NOx catalyst, occlusion substance of NOx occlusion reduction type catalyst, and DPF for catching PM of the exhaust gas post-treatment apparatus to be arranged at the lower side on a diesel engine.

In addition, the regeneration control method of exhaust gas post-treatment apparatus of the present invention have the following effects when the exhaust gas post-treatment apparatus is a continuous regeneration type diesel particulate filter system having a filter for catching particulate in the engine exhaust gas, and oxidizing and eliminating the caught particulate matter by the catalytic function.

The use of the aforementioned injection control method permits to regenerate the filter through the oxidation and elimination of PM accumulated in the filter, by rising the exhaust gas temperature, even if the filter regeneration comes to be required in an engine operation state difficult for the filter regeneration by the oxidation of PM due to low exhaust gas temperature, such as idling operation, extremely low load operation or the like.

Further, the filter can be regenerated without deterioration of the drivability, because the exhaust temperature can be risen, suppressing the variation from the engine speed and torque in the normal engine operation before starting the regeneration.

Therefore, the rising of exhaust gas pressure can be controlled, because the filter can be regenerated any time. Consequently, generation of engine stole or other inconveniences due to the exhaust pressure rising can be avoided. Furthermore, as excessive accumulation of PM can be avoided, the filter melting damage which occurs easily during the PM oxidation following this excessive accumulation of PM can be prevented.

DETAILED DESCRIPTION OF THE PREFERRED EMBODIMENT

Now, embodiments of the diesel engine fuel injection control method and the regeneration control method of continuous regeneration type DPF system according to the present invention shall be described based on drawings.

The first embodiment of the diesel engine fuel injection control method concerns the after injection, the second embodiment the injection quantity of the pilot injection and the retard of the main injection, the third embodiment the injection quantity of the pilot injection and the injection quantity of the main injection, and the fourth embodiment the main injection and the multistage auxiliary injection.

First Embodiment

First, the diesel engine fuel injection control method of the first embodiment concerning the after injection shall be described.

Figure 1:
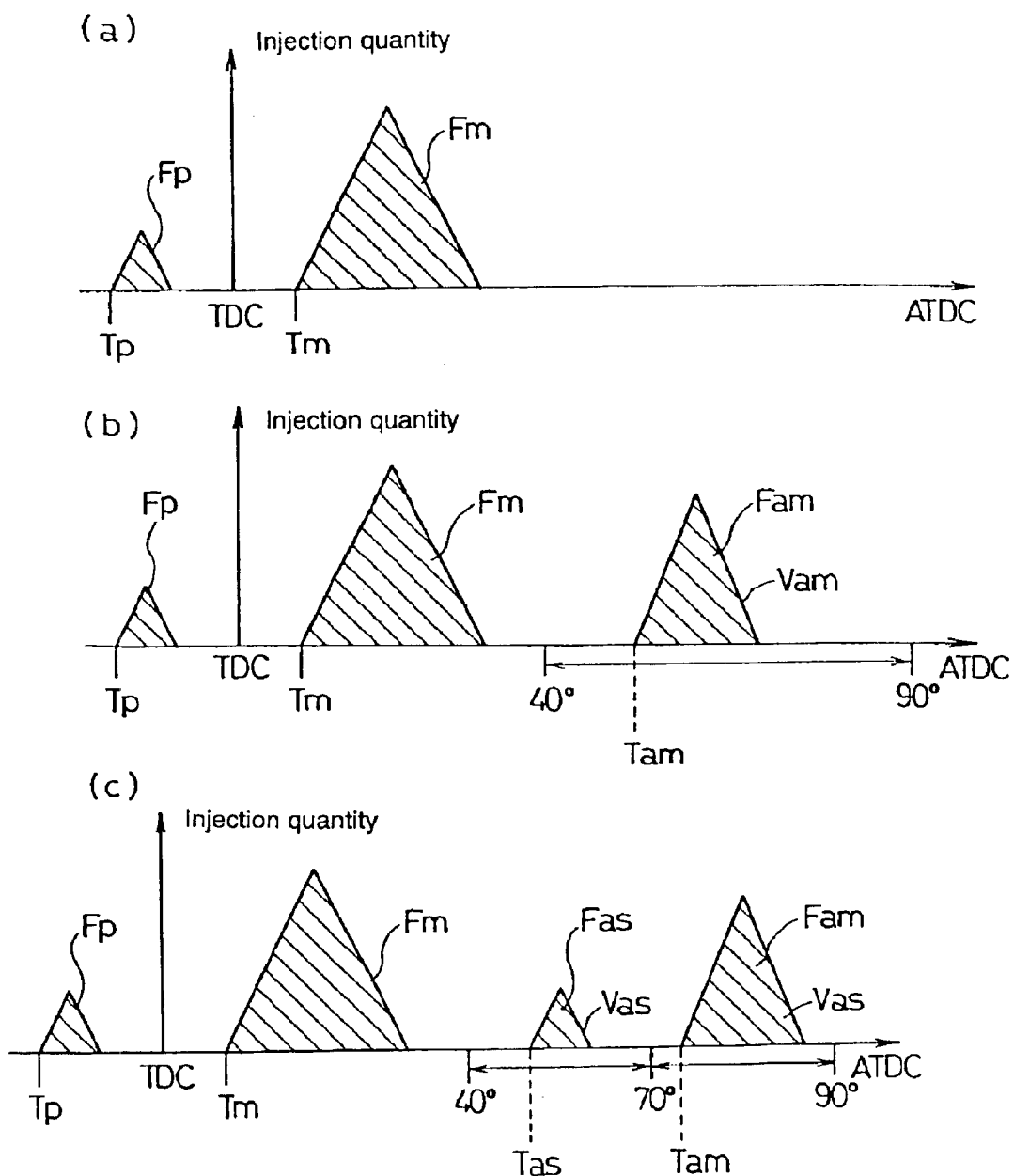
FIG. 1 is a diagram showing the relation between pilot injection, main injection, sub after injection and main after injection, in the fuel injection control of a first embodiment, (a) shows the normal fuel injection before the after injection, (b) shows the after injection comprising only a main after injection in the case of no sub after injection, and (c) shows the sub after injection and the main after injection.

In this diesel engine fuel injection control method, pilot injection Fp and main injection Fm as shown in FIG. 1(a) are performed during the normal operation. The injection quantity of this pilot injection Fp is a prescribed value and, a previously established fixed quantity.

There, the after injection is performed when it becomes necessary to rise the exhaust gas temperature, or, generate temporally an exhaust gas of reductive atmosphere by lowering the oxygen concentration in the exhaust gas, in order to activate the oxidation catalyst, regenerate absorption/occlusion substance of NOx occlusion reduction type catalyst, or regenerate the filter by burning and eliminating PM caught by the DPF.

For this after injection, in order to make the oxygen concentration in the exhaust gas and the exhaust gas temperature the predetermined desired value, the fuel injection is controlled with previously established injection quantity Vam and injection timing Tam of the main after injection Fam, or the oxygen concentration and the exhaust gas temperature are detected by an oxygen concentration sensor, an temperature sensor or others, the injection quantity Vam and injection timing Tam of the main after injection Fam are modified by the feedback control, and the main after injection Fam is performed with thus obtained optimal injection quantity Vam and injection timing Tam.

There, in case where it is possible to secure the combustion by an after injection comprising only the main after injection Fam, as shown in FIG. 1(b), this main after injection Fam is performed in a range of 40° ATDC to 90° ATDC of the crank angle. Namely, the after injection is performed in the range of 40° to 90° of the crank angle after passing through the top dead center TDC (ATDC).

Figure 2:
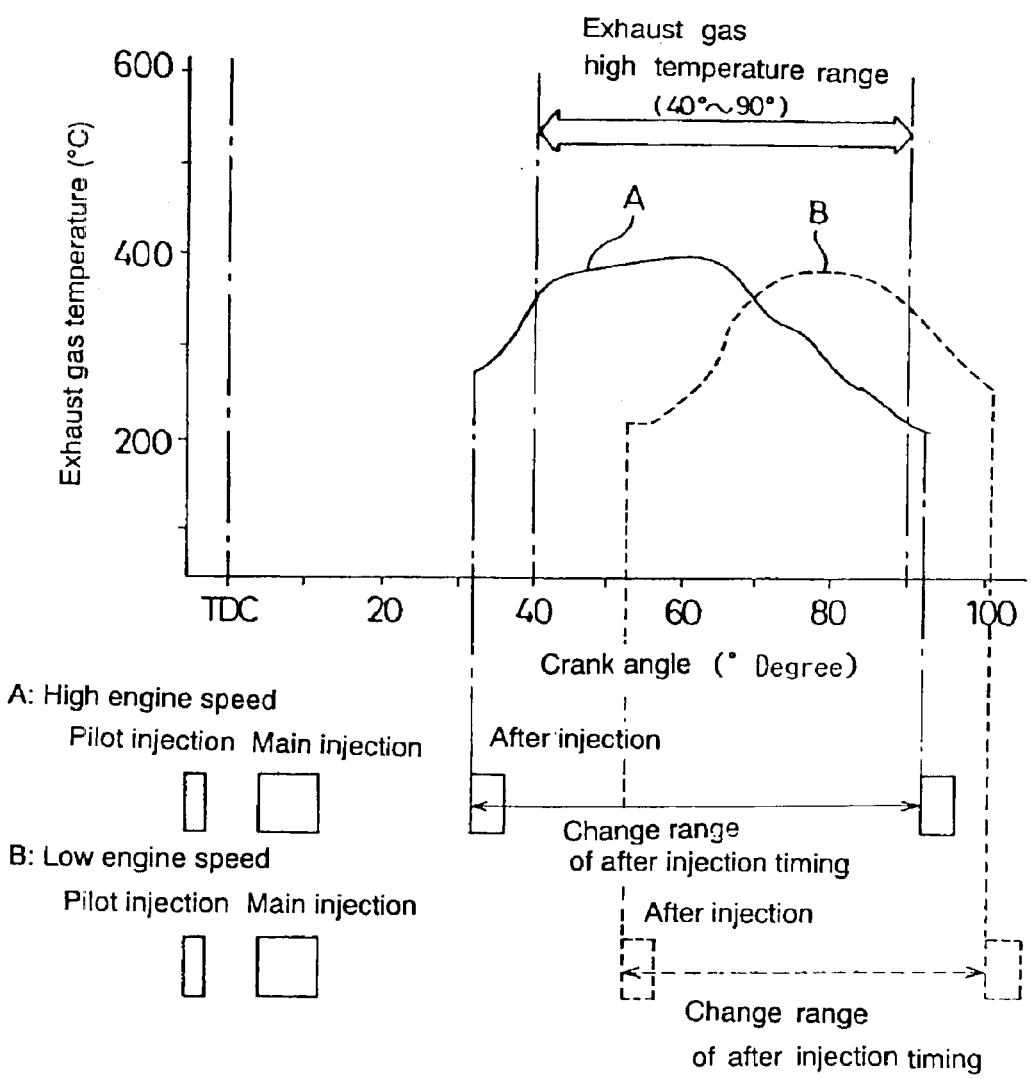
FIG. 2 is a diagram showing the relation between the injection timing of the after injection and the exhaust gas temperature.

The range of 40° ATDC to 90° ATDC for the after injection comprising only the main after injection Fam is the one determined by experiment. In short, as shown in FIG. 2, it is determined from the range where the exhaust gas temperature becomes high when the injection timing of the main after injection (after injection) Fam is changed, respectively, in the case of high engine speed operation (A) and in the case of low engine speed operation (B) for the engine operation state.

This high engine speed means an engine speed equal or superior to the engine speed generating the maximum torque called "torque point", and the low engine speed an engine speed equal or inferior to this torque point. The idling operation is included in this low engine speed. This torque point may depend on the kind of engine, but, for instance, is an engine speed of about 2500 rpm.

Besides, in case where the combustion can not be secured only by this single main after injection Fam, the after injection is performed in two-stage injection comprising a sub after injection Fas and a main after injection Fam, as shown in FIG. 1(c), and the sub after injection Fas is performed in a range of 40° ATDC to 70° ATDC of the crank angle and the main after injection Fam is performed in a range of 70° ATDC to 90° ATDC of the crank angle. It should be noted that the injection quantity Vas of this sub after injection Fas is on the order of about 5% to 50% of the injection quantity Vam of main after injection Fam.

This range of injection timing 70° ATDC to 90° ATDC for the main after injection Fam is the one determined by experiment, and is determined from the range where the exhaust gas temperature becomes high when the injection timing of the main after injection Fam is changed, by operating with the sub after injection Fas fixed to the predetermined value of 40° ATDC to 70° ATDC.

Figure 3:
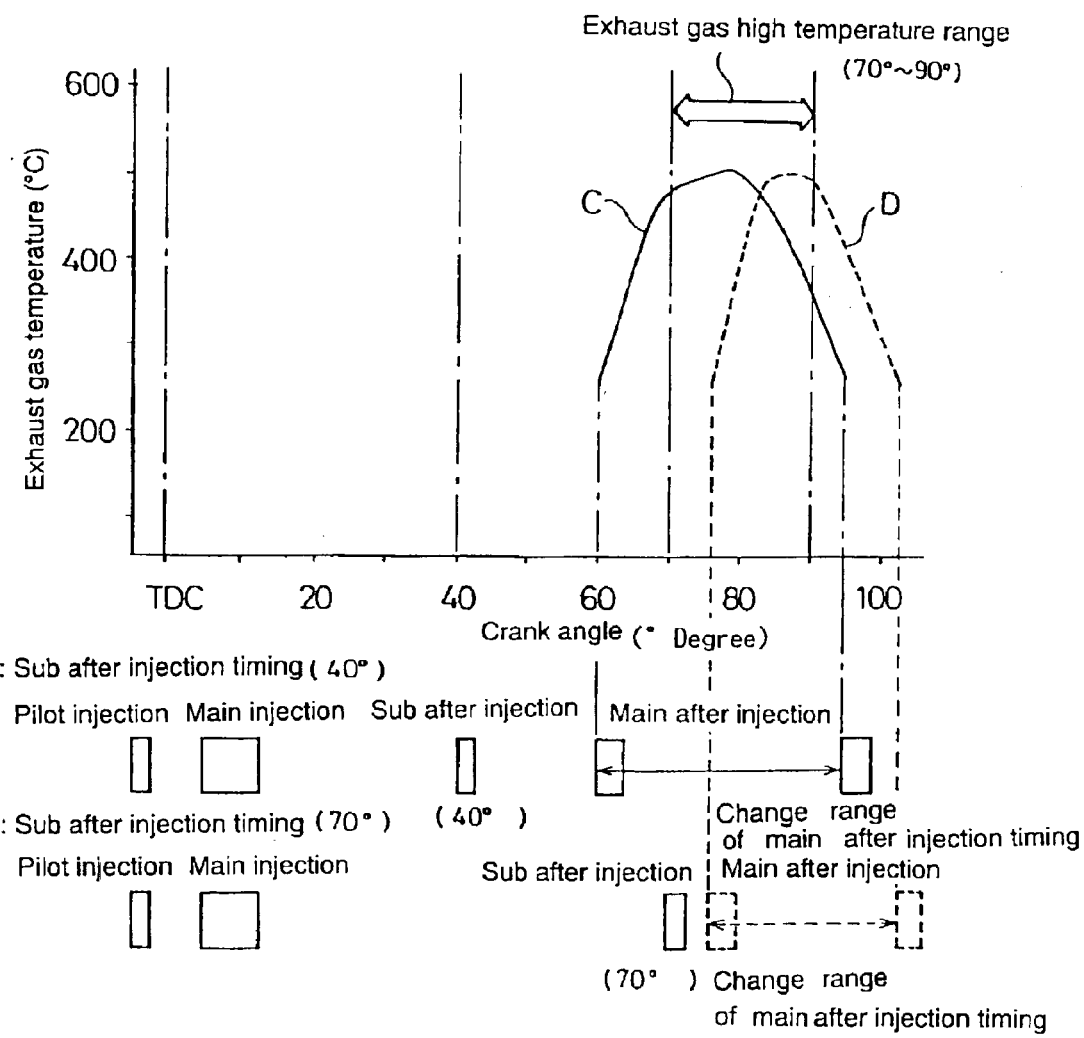
FIG. 3 is a diagram showing the relation between the injection timing of the sub after injection and the main after injection and the exhaust gas temperature, in the case of fixing the injection timing of the sub after injection and changing the injection timing of the main after injection.

FIG. 3 shows respective exhaust gas temperatures when the injection timing of the main after injection Fam is changed, in the case of operating with the sub after injection Fas fixed to the predetermined value of 40° ATDC (C) and in the case of operation by fixing at to 70° ATDC (D). A range of this FIG. 3 where the exhaust gas becomes hot (70° ATDC to 90° ATDC) is selected and taken as the injection timing of the main after injection Fam.

Figure 4:
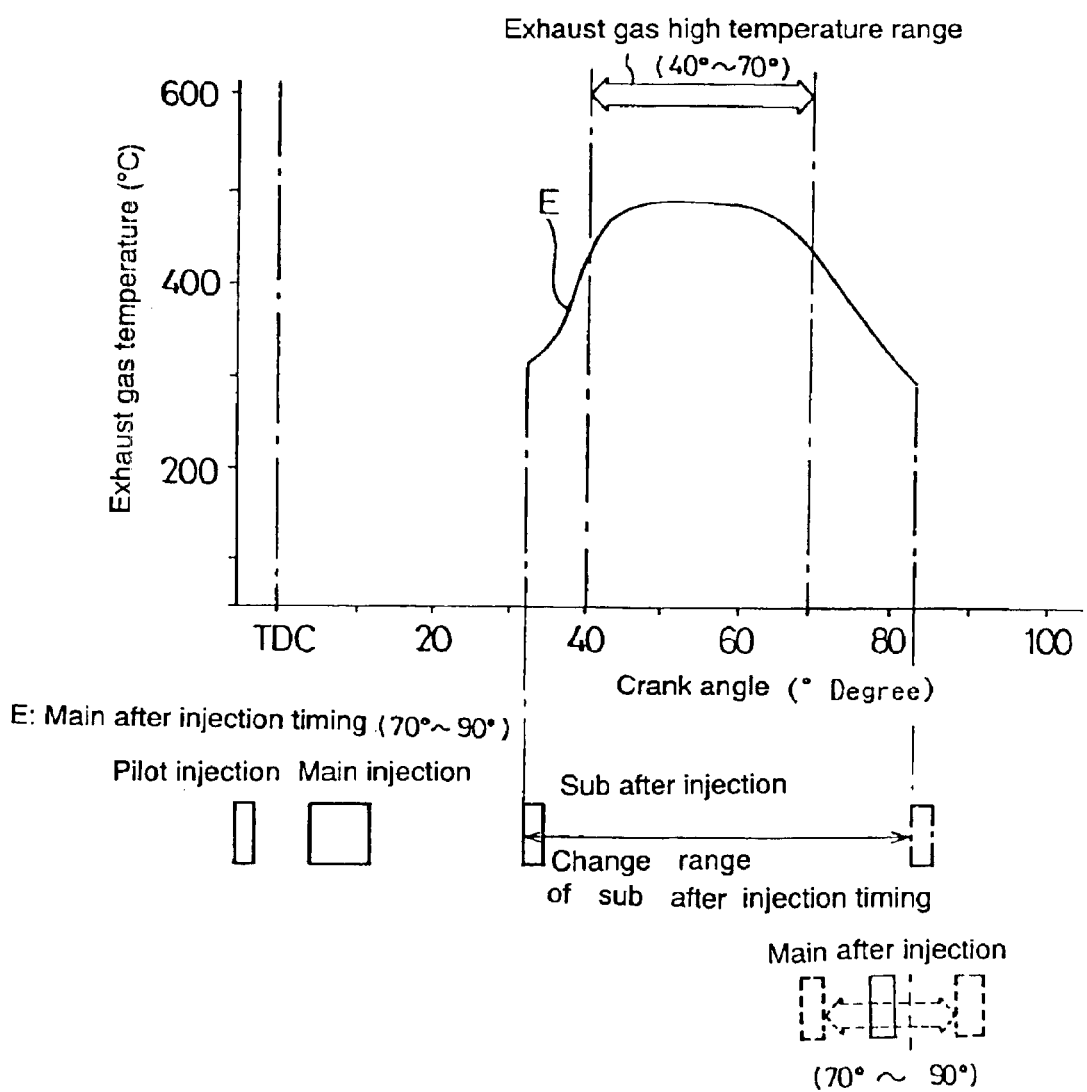
FIG. 4 is a diagram showing the relation between the injection timing of the sub after injection and the main after injection and the exhaust gas temperature, in the case of fixing the injection timing of the main after injection and changing the injection timing of the sub after injection.

Now, the range of 40° to 70° ATDC for the sub after injection Fas is also the one determined by experiment, and is determined from the range where the exhaust gas temperature becomes high when the injection timing of the sub after injection Fas is changed, in the case of setting the main after injection Fam to a predetermined value in the range of 70° ATDC to 90° ATDC. FIG. 4 shows the exhaust gas temperature when the injection timing of the sub after injection Fas is changed (E), in the case of setting the main after injection Fam to a predetermined value in the range of 70° ATDC to 90° ATDC. A range of this FIG. 4 where the exhaust gas becomes hot (40° to 70°) is selected and taken as the injection timing of the sub after injection Fas.

A variety of methods exist for injection control of these sub after injection Fas and main after injection Fam, and two of them shall be described below.

In the first method, the after injection Fas, Fam is performed as follows.

First, the injection quantity Vam and the injection timing Tam of the main after injection Fam are calculated from map data MVam (Q,Ne), MTam (Q, Ne) or others, showing the relation between the injection quantity Vam and the injection timing Tam of the main after injection Fam in respect of torque Q and engine speed Ne indicating respective operation states of an engine, determined preliminarily. These map data MVam, MTam or others are data determined preliminarily by experiment or computation, and input previously into a control apparatus for performing this injection control.

This allows to control the after injection by selecting appropriate injection quantity Vam and injection timing Tam of the main after injection Fam and, thereby, to perform an appropriated main after injection Fam by a relatively simple algorism.

Also, the injection quantity Vas and the injection timing Tas of the sub after injection Fas are calculated from map data MVas (Q,Ne), MTas (Q, Ne) or others, showing the relation between the injection quantity Vas and the injection timing Tas of the sub after injection Fas in respect of torque Q and engine speed Ne indicating respective operation states of an engine, determined preliminarily. These map data MVas, MTas or others are data determined preliminarily by experiment or computation, and input previously into a control apparatus for performing this injection control.

It should be noted that information data whether to perform or not the sub after injection Fas can be included by setting MVas (Q, Ne)=0 in the range without performing the sub after injection Fas, and in the case of setting all to zero, the after injection control is set to not to perform the sub after injection Fas.

According to this composition, the fuel of the main after injection Fam can be burned efficiently by performing the sub after injection Fas efficiently, all the way saving the fuel, by a relatively simple algorism, because the after injection control can be performed by selecting appropriate injection quantity Vas and injection timing Tas of the sub after injection Fas.

In addition, here, though the injection quantity Vas and the injection timing Tas of the sub after injection Fas are determined for respective engine operation states (Q, Ne), it can also be composed to determine for the injection quantity Vam and injection timing Tam of the main after injection Fam. In this case, the map data will take a format of MVas2 (Vam, Tam), MTas2 (Vam, Tam).

Also, the second method is performed similarly to the first method concerning the injection control of the main after injection Fam.

In other words, the injection quantity Vam and injection timing Tam of the main after injection Fam are computed according to the relation of the injection quantity MVam (Q, Ne) and the injection timing MTam (Q, Ne) of the main after injection Fam are determined in respective engine operation states.

Then, in this second method, a voltage of about 50 to 200V is applied to a conductive portion facing to the inside of the combustion chamber and separated by an appropriate interval (for instance, about 1 mm), and an ion gap sensor for detection of electric resistance of this conductive portion is installed to monitor the fuel combustion state in the engine combustion chamber.

All the way monitoring the fuel combustion state in the engine combustion chamber by this ion gap sensor, it is judged whether to perform or not the sub after injection Fas, based on the output value of this ion gap sensor, and the sub after injection Fas is performed based on this judgment. In short, it is composed to perform the sub after injection Fas if the output of the ion gas sensor exceeds a predetermined judgment value, and not to perform the sub after injection Fas if the output of the ion gas sensor does not exceed the predetermined judgment value.

To be more precise, it is so controlled to perform the sub after injection Fas when the ion concentration lowers after the main injection Fm and the electric resistance exceeds the predetermined judgment value, as the fuel of the main injection Fm has burned out and the fuel of the main after injection Fam becomes hard to ignite and, on the contrary, not perform the sub after injection Fas when the ion concentration is high and the electric resistance is lower than the predetermined judgment value, as the combustion of the main injection Fm is sustained and the fuel of the main after injection Fam can ignite easily.

Furthermore, the feedback control is realized by taking the output of this ion gap sensor as desired value and at least one of injection quantity Vas and injection timing Tas of the sub after injection Fas as control variable. It should be appreciated that, in this case, the other not taken as control value shall be predetermined fixed quantity.

In short, when the injection quantity Vam and injection timing Tam of the main after injection Fam are determined, the main after injection Fam is performed with this injection quantity Vam and injection timing Tam and, at the same time, the sub after injection Fas is performed with the injection quantity Vas and injection timing Tas through this feedback fcontrol. Thereby, it is so composed to increase/decrease automatically at least one of injection quantity Vas and injection timing Tas of the sub after injection Fas.

In the case of using this ion gap sensor, it is unnecessary to determine, previously, injection quantity Vas and injection timing Tas of the sub after injection Fas corresponding to the engine operation state or the injection timing Tam of the main after injection Fam, allowing also to burn the fuel of the main after injection Fam securely.

Moreover, being feedback control, the injection quantity Vas of the sub after injection Fas can be limited to the strict minimum, allowing to save more fuel.

Second Embodiment

Figure 5:
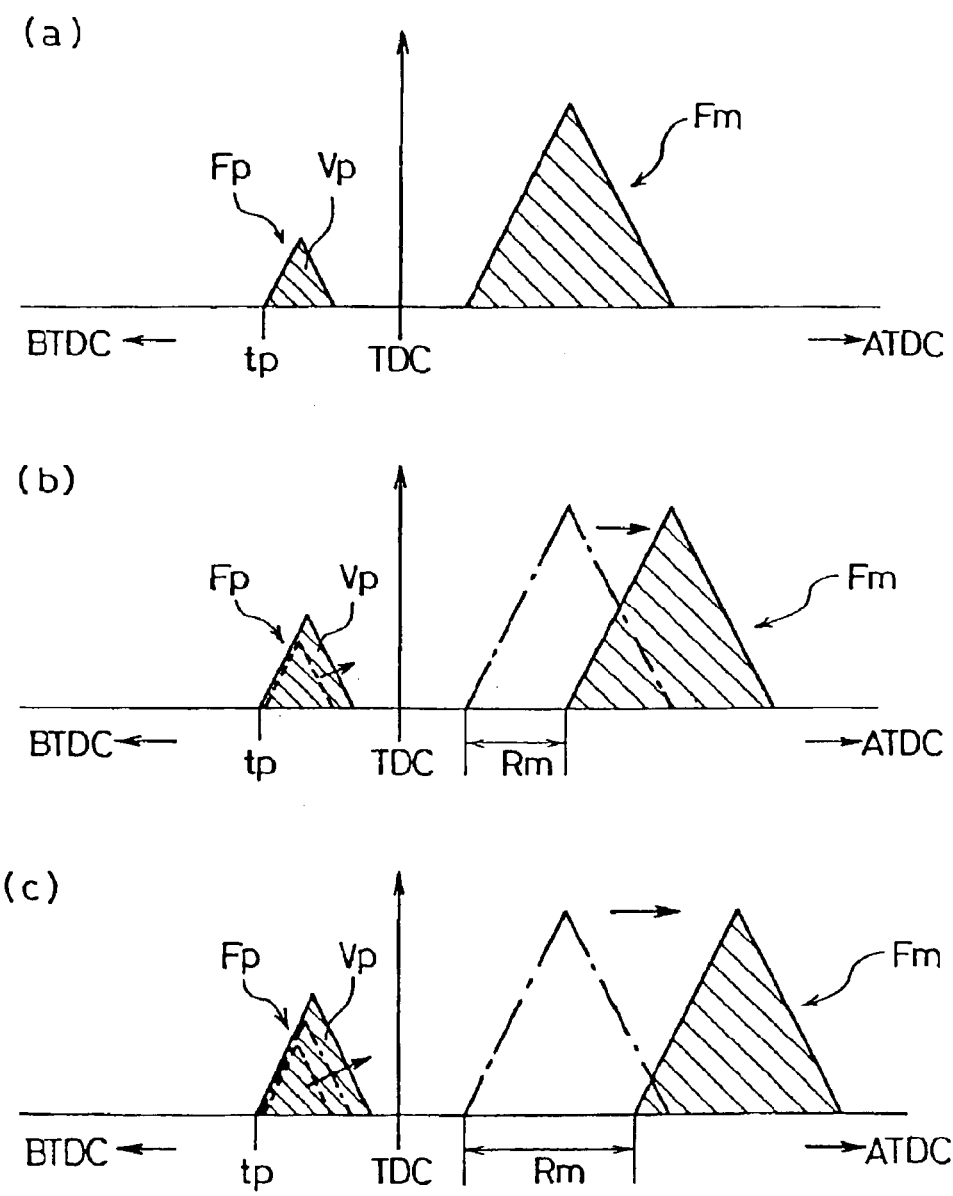
FIG. 5 is a diagram showing the relation between pilot injection and main injection, in the fuel injection control of a second embodiment, (a) shows the injection before retarding the main injection, (b) shows the injection in the case of small retard of the main injection, and (c) shows the injection in the case of large retard of the main injection.

In the diesel engine fuel injection control method of the second embodiment concerning the injection quantity of the pilot injection and the retard of the main injection, pilot injection Fp and main injection Fm as shown in FIG. 5($a$) are performed during the execution of the normal pilot injection. The injection quantity of this pilot injection Fp is a prescribed value and, a previously established fixed quantity.

There, the retard of the main injection Fm is increased/decreased when it becomes necessary to rise the exhaust gas temperature, or, generate temporally an exhaust gas of reductive atmosphere by lowering the oxygen concentration in the exhaust gas, in order to rise the catalyst temperature of the exhaust gas post-treatment apparatus, regenerate NOx occlusion reduction type catalyst, or regenerate the filter by burning and eliminating PM caught by the DPF.

For this retard of the main injection Fm, in order to make the oxygen concentration in the exhaust gas and the exhaust gas temperature the predetermined desired value, the main injection FM is performed by a previously established retard amount Rm, or the oxygen concentration and the exhaust gas temperature are detected by an oxygen concentration sensor, an temperature sensor or others, the retard amount Rm is determined by the feedback control, and the main injection FM is performed with these retard amounts Rm.

In the first method of this second embodiment, the injection quantity Vp of the pilot injection Fp is calculated from the relation between the retard amount Rm and the injection quantity Vp of the pilot injection Fp, determined preliminarily, by experiment or others, and the pilot injection Fp is performed with this injection quantity Vp as shown in FIGS. 5($b$) and 5($c$).

This fuel injection control allows to generate an exhaust gas state necessary for the catalyst regeneration or others, because the main injection Fm can burn without misfire, even when a large retard amount Rm is adopted, in the main injection Fm.

Moreover, as this injection quantity Vp of the pilot injection Fp increases/decreases in correspondence to the retard amount Rm of the main injection Fm, according to a relation determined preliminarily by experiment or others, the fuel would not be consumed unnecessarily, and the deterioration of the fuel efficiency can be limited to the minimum.

Besides, in the second method of the second embodiment, a voltage of about 50 to 200V is applied to a conductive portion facing to the inside of the combustion chamber and separated by an appropriate interval (for instance, between the glow plug and combustion chamber wall), and an ion gap sensor for detection of electric current flowing in this conductive portion is installed to monitor the fuel combustion state in the engine combustion chamber.

Furthermore, the feedback control is realized by taking the output (voltage value) of this ion gap sensor as desired value and the injection quantity Vpc of the pilot injection Fp as control variable.

There, when the retard amount Rm and the injection quantity of the main injection Fm are determined, the main injection Fam is performed with this retard amount Rm and, at the same time, the injection quantity Vp of the pilot injection Fp is controlled by this feedback control.

To be more precise, it is so controlled to increase the injection quantity Vp of the pilot injection Fp when the ion concentration lowers after the pilot injection Fp and the voltage drop is small, as the fuel of the pilot injection Fp has burned out and the fuel of the pilot injection Fp becomes hard to ignite and, on the contrary, decrease the injection quantity Vp of the pilot injection Fp when the ion concentration is high and the voltage drop is large, as there is enough fuel of the pilot injection Fp and the fuel of the main injection Fm can ignite easily.

By this fuel injection control through increase/decrease of the injection quantity Vp of the pilot injection Fp, the injection quantity Vp of the pilot injection Fp can be optimized in respect to the retard amount Rm of the main injection Fp of that time, by increasing/decreasing the pilot injection quantity, through the detection of misfire occurrence or possibility of misfire.

In short, it is composed to increase/decrease automatically the injection quantity Vp of the pilot injection Fp, according to the increase/decrease of the retard amount Rm of the main injection Fp.

This fuel injection control allows generating an exhaust gas composition necessary for the catalyst function, as the main injection Fm can be burned without misfire, even if a large retard amount Rm is taken, in the main injection Fm.

More specifically, in the case of not increasing the injection quantity Vp of the pilot injection Fp of the prior art, the misfire occurred and white smoke was generated with the retard amount Rm of the main injection on the order of about 10° ATDC in crank angle, while in the present invention, the retard amount Rm of the main injection Fp can be retarded until 40° ATDC to 50° ATDC in crank angle.

Further, in the case of the second method using this ion gap sensor, it is unnecessary to determine, previously, the injection quantity Vp of the pilot injection Fp corresponding to the retard amount Rm of the main injection Fp, allowing, also, to burn the fuel of the main injection Fm securely. Moreover, being feedback control, the injection quantity Vp of the pilot injection Fp can be limited to the strict minimum, allowing to save more fuel.

Both in the first method or the second method, the injection quantity Vp in the pilot injection Fp is increased/decreased in correspondence to the increase/decrease of the retard amount Rm of the main injection Fp, without changing the timing tp to start the injection of the pilot injection Fp. By fixing this timing tp of the pilot injection Fp, the fuel of the pilot injection Fp can be burned securely near the top dead center where the pressure and the temperature are always high facilitating the fuel combustion, and the fuel of the main injection Fm can ignite before the temperature decreases, by securing the kindling charcoal.

Third Embodiment

Figure 6:
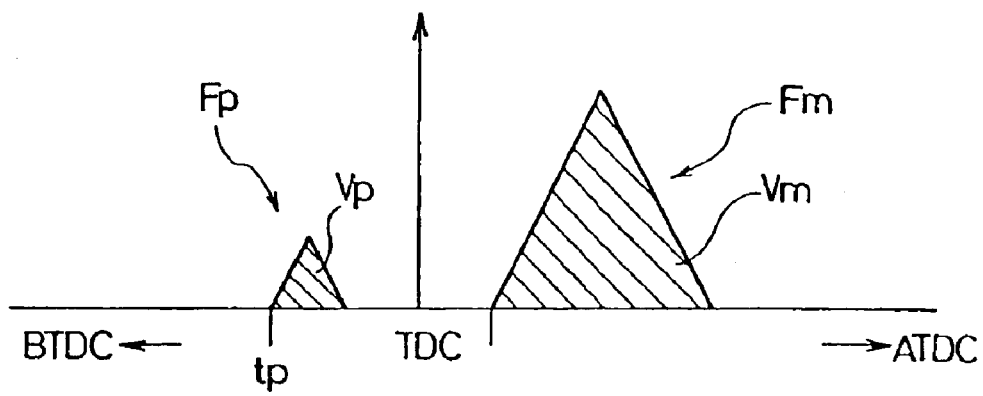
FIG. 6 is a diagram showing the relation between pilot injection and main injection, in the fuel injection control of a third embodiment, (a) shows the injection before increasing/decreasing the injection quantity of the main injection, (b) shows the injection in the case of increased injection quantity of the main injection, and (c) shows the injection in the case of decreased injection quantity of the main injection.
Figure 6:
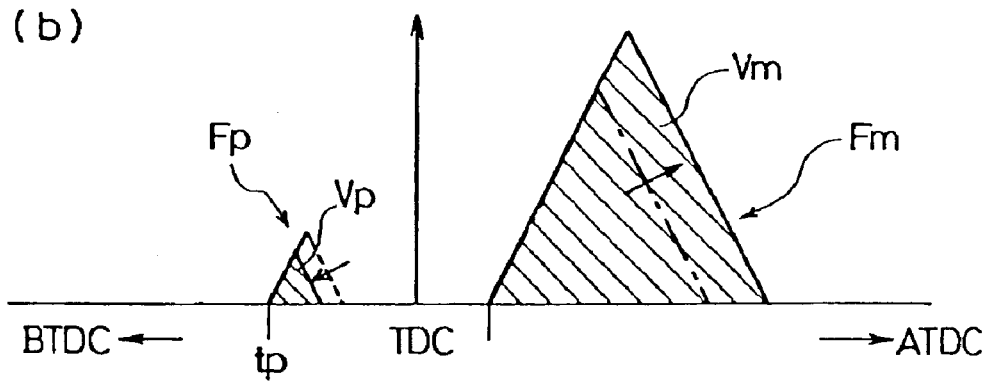
Figure 6:
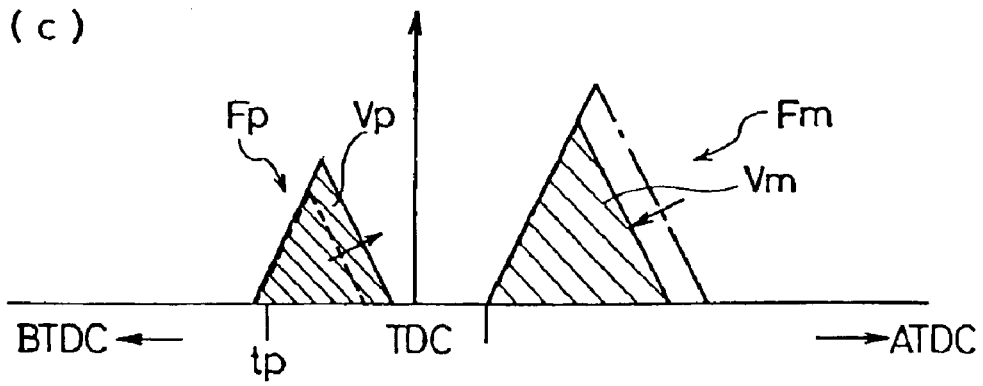

In the diesel engine fuel injection control method of the third embodiment concerning the injection quantity of the pilot injection and the injection quantity of the main injection, pilot injection Fp and main injection Fm as shown in FIG. 6(a) are performed during the execution of the normal pilot injection. The injection quantity of this pilot injection Fp is a prescribed value and, a previously established fixed quantity.

There, the injection quantity of the main injection Fm is increased/decreased when it becomes necessary to rise the exhaust gas temperature, or, generate temporally an exhaust gas of reductive atmosphere by lowering the oxygen concentration in the exhaust gas, in order to rise the catalyst temperature of the exhaust gas post-treatment apparatus, regenerate NOx occlusion reduction type catalyst, or regenerate the filter by burning and eliminating PM caught by the DPF.

For this increase/decrease of the injection quantity of the main injection Fm, in order to make the oxygen concentration in the exhaust gas and the exhaust gas temperature the predetermined desired values, the injection quantity of the main injection Fm is performed by a predetermined injection quantity Vm, or the injection quantity Vm is determined through a feed back control by detecting the oxygen concentration or the exhaust gas temperature by means of an oxiden concentration sensor, a temperature sensor, or other detection means, thereby performing the main injection Fm with the obtained injection quantity Vm.

In the first method according to the third embodiment, similarly to the first method of the second embodiment, the injection quantity Vp of the pilot injection Fp is calculated from the relation between the injection quantity Vm and the injection quantity Vp of the pilot injection Fp, determined preliminarily, by experiment or others, for the injection quanty Vm of this main injection Fm, and the pilot injection Fp is performed with this injection quantity Vp as shown in FIGS. 6(b) and 6(c), from the normal injection control shown in FIG. 6(a).

This fuel injection control allows to generate an exhaust gas state necessary for the catalyst regeneration or others, because the main injection Fm can burn without misfire, even when the injection quantity Vm is reduced, in the main injection Fm.

Moreover, as this injection quantity Vp of the pilot injection Fp increases/decreases in correspondence to the injection quantity Vm of the main injection Fm, according to a relation determined preliminarily by experiment or others, the fuel would not be consumed unnecessarily, and the deterioration of the fuel efficiency can be limited to the minimum.

Besides, in the case of changing the injection quantity Vp of the pilot injection Fp in accordance with the injection quantity Vm of the main injection Fm also, similarly to the second method of the second embodiment, the injection quantity Vp of the pilot injection Fp can be controlled through the feedback control, by using a combustion state detection means, such as ion gap sensor or others.

Fourth Embodiment

Now, the diesel engine fuel injection control method of the fourth embodiment for performing a multistage auxiliary injection before the main injection.

Figure 7:
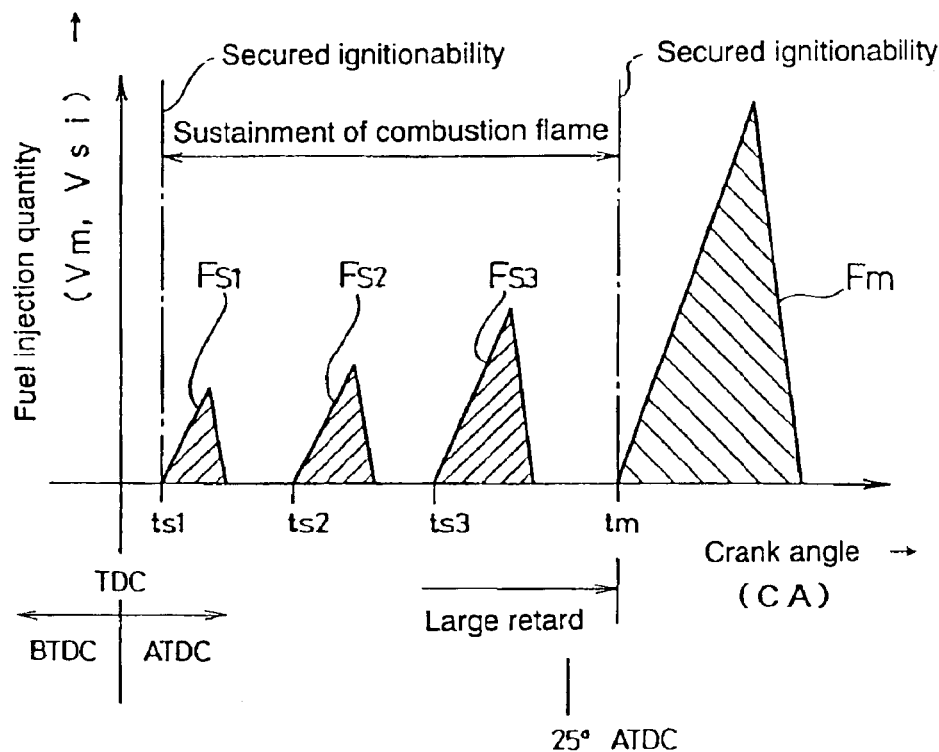
FIG. 7 is a schematic illustration showing an example of fuel injection control of a fourth embodiment.

In the composition of this diesel engine fuel injection control method, the engine fuel injection is performed by dividing into the main injection and the multistage auxiliary injection before the main injection, as shown in FIG. 7, the injection timing tm of the main injection Fm is retarded and, at the same time, the injection of the auxiliary injection is performed in multistage of twice or more (three-stage injection in FIG. 7) at a timing before injection timing tm of the main injection Fm.

First, the initial first auxiliary injection Fs1 is injected and ignited at a timing ts1 near the top dead center (TDC) where the pressure and the temperature in the cylinder are high, and permit the ignitionability. The fuel injection quantity Vs1 of this first auxiliary injection Fs1 shall be low enough not to affect the torque generation.

The second auxiliary injection Fs2 shall be performed at a timing ts2 before the end of combustion of the injected fuel of this first auxiliary injection Fs1. In this second auxiliary injection Fs2, as the piston begins to descend, the torque generation is suppressed, even if more fuel injection quantity Vs2 than the first auxiliary injection Fs1 is injected.

The third auxiliary injection Fs3 shall be performed at a timing ts3 before the end of combustion of the injected fuel of this second auxiliary injection Fs2. In this third auxiliary injection Fs3, the torque generation is suppressed, even if further more fuel injection quantity Vs3 than the fuel injection quantity Vs2 of the second auxiliary injection Fs2 is injected.

There, the ignitionability is secured by the first injection Fs1 of these auxiliary injections, and the combustion flame is sustained until the injection timing tm of the main injection Fm, by the second and following injections Fs2, Fs3, allowing to burn securely even with a largely retarded main injection Fm.

Consequently, white smoke or misfire do not occur, and exhaust temperature can be risen considerably, because the main injection Fm can be ignited securely, even when the main injection Fm is largely retarded, through the sustainment of the combustion flame by this plurality of auxiliary injections Fsi.

As a result, it becomes possible to rise the exhaust temperature keeping the generated torque low, and an exhaust temperature necessary for PM regeneration comes to be secured even under a low load, by this engine fuel injection control method.

Figure 8:
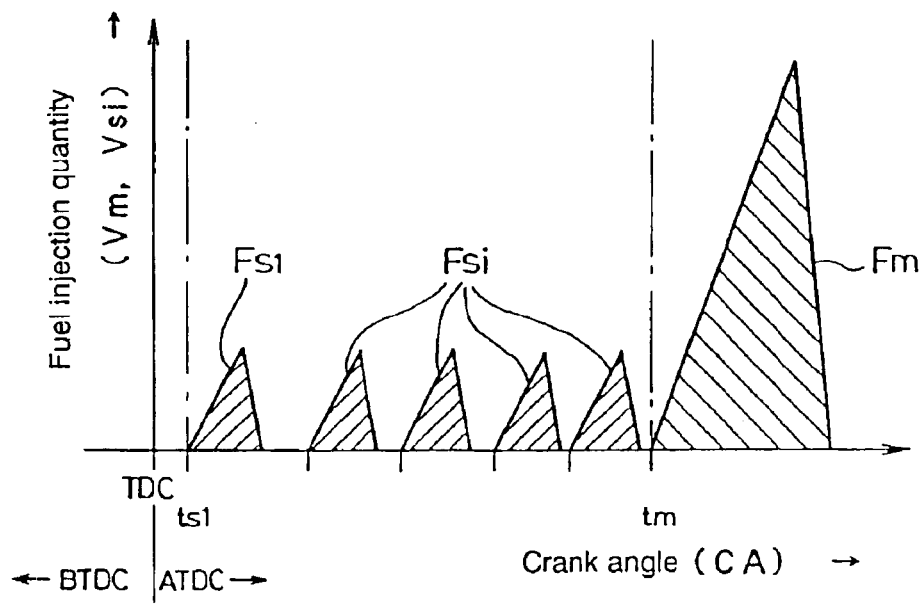
FIG. 8 is a schematic illustration showing another example of fuel injection control of the fourth embodiment.

Though in the example of FIG. 7, the number of time of auxiliary injection Fsi is et to 3, and the quantity is increased gradually from the fist fuel injection quantity Vs1 to the third fuel injection quantity Vs3, passing through the second fuel injection quantity Vs2, the number of injection can be increased by setting the fuel injection quantity Vsi of respective auxiliary injection Fsi equal as another example shown in FIG. 8. Also, although not shown, several auxiliary injections may be injection with a same fuel injection quantity, and thereafter, the auxiliary injection can be performed with a increased fuel injection quantity.

Now, hereinafter, the regeneration control method of exhaust gas post-treatment apparatus of an embodiment according to the present invention shall be described taking continuous regeneration type diesel particulate filter system (continuous regeneration type DPF system, hereinafter), referring to drawings. This regeneration control method of continuous regeneration type DPF system is a regeneration control method using the aforementioned fuel injection control method.

Figure 9:
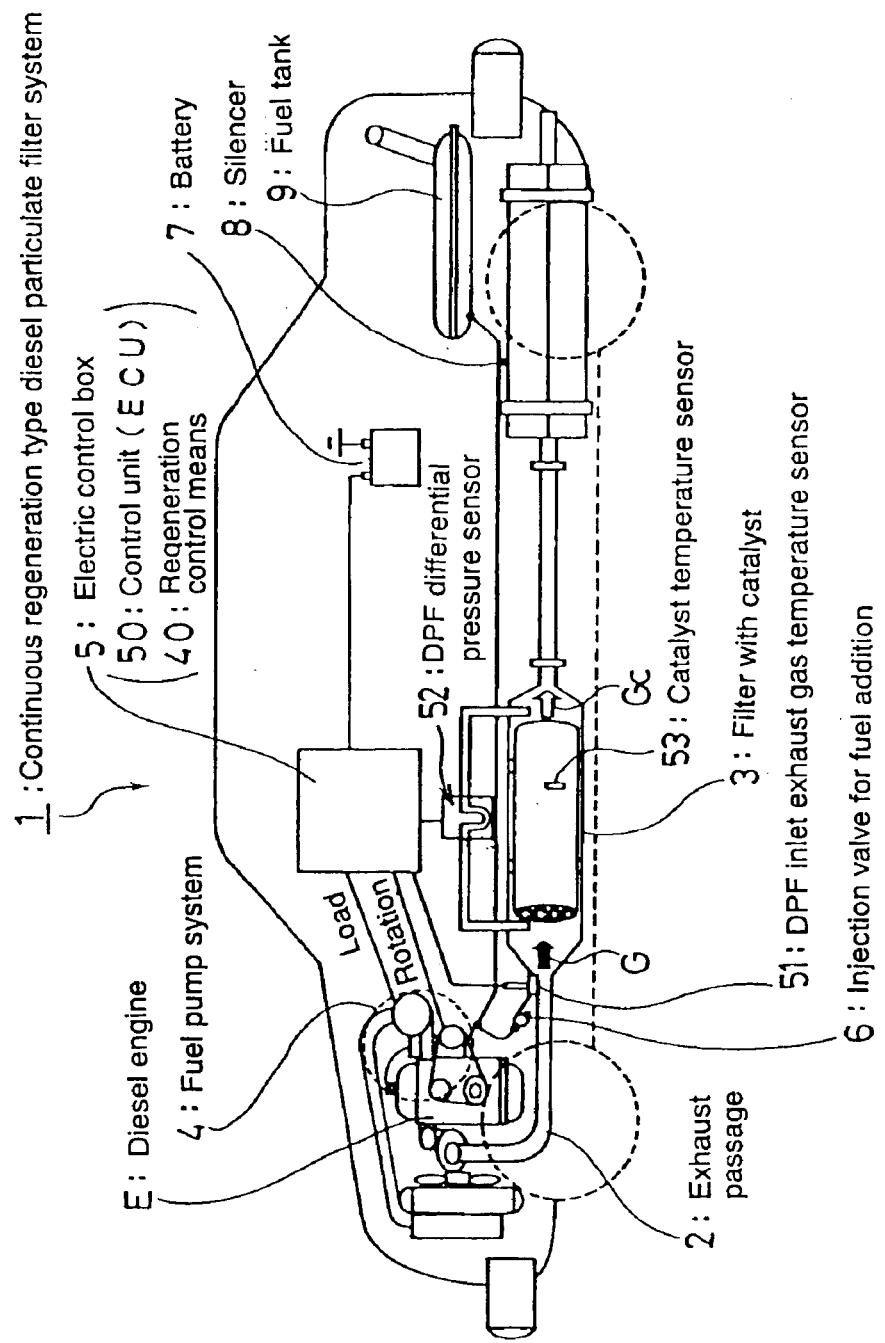
FIG. 9 is a composition diagram of a continuous regeneration type particulate filter system of an embodiment according to the present invention.
Figure 10:
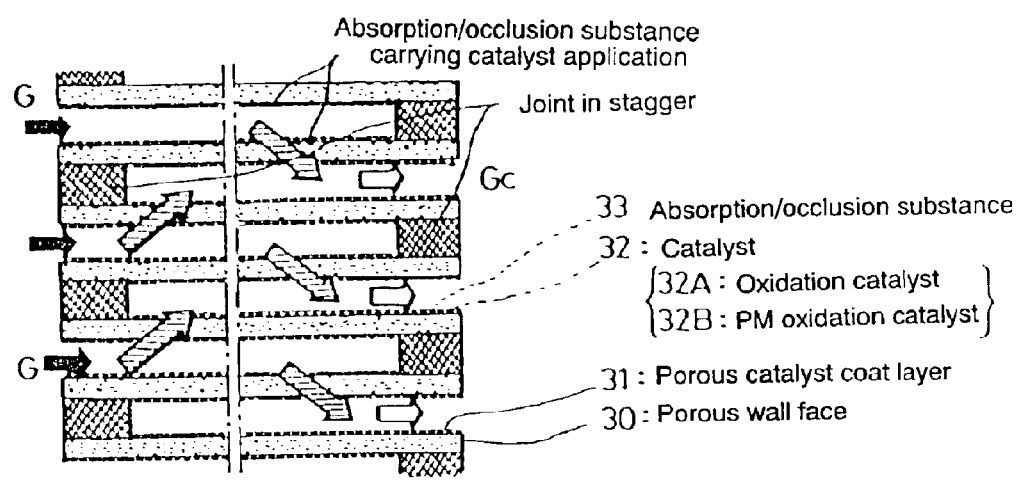
FIG. 10 is a schematic composition diagram of a filter with catalyst of an embodiment according to the present invention.

FIG. 9 shows the composition of this continuous regeneration type DPF system 1. This continuous regeneration type DPF system 1 comprises a filter with catalyst (filter) 3 installed in an exhaust passage 2 of an engine E, and a regeneration control means 40.

This filter with catalyst 3 is formed with a monolith honeycomb form wall flow type filter in which inlets and outlets of channels of a porous ceramic honeycomb are in stagger stopped up alternately, and a porous catalyst coat layer 31 carrying a catalyst 32 is disposed on a porous wall face 30 of this filter 3.

This catalyst 32 is composed of a precious metal oxidation catalyst 32A such as platinum (pt), palladium (Pd), copper (Cu), and a PM oxidation catalyst 32B such as cerium dioxide ($CeO_2$) presenting an oxidation activity in respect to HC, CO and PM.

Besides, a regeneration control means 40 is, normally, included in a control unit (ECU: engine control unit) 50 for controlling the engine E operation in general, inputs the output from a DPF inlet exhaust gas temperature sensor 51 on the exhaust inlet side of the filter with catalyst 3 and a DPF differential pressure sensor 52 for detecting the differential pressure before and after the filter with catalyst 3, for controlling the regeneration of the filter with catalyst 3.

Now, the regeneration control method in the continuous regeneration type DPF system 1 of the aforementioned composition.

Figure 11:
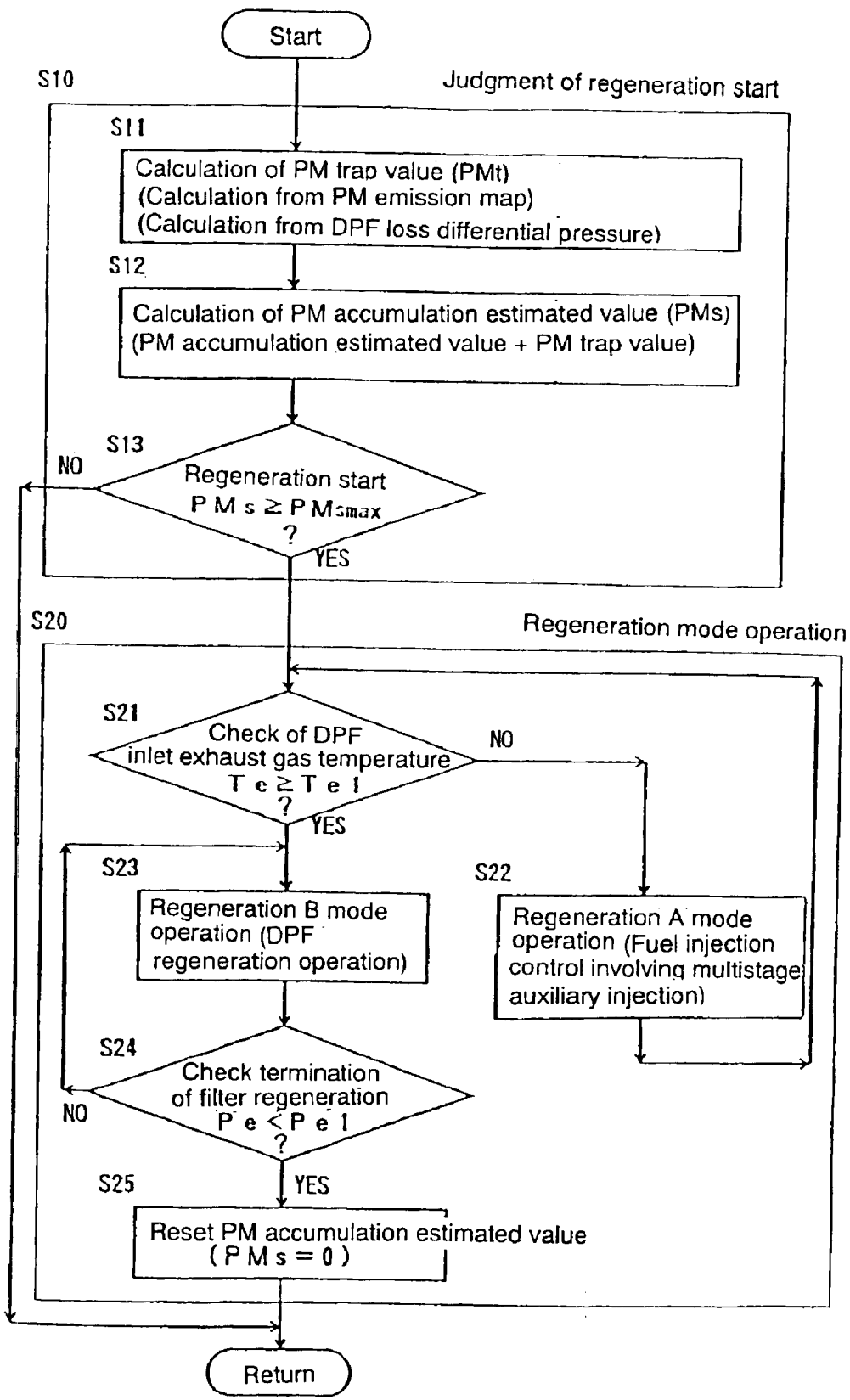
FIG. 11 is a flow chart showing a regeneration control method of a continuous regeneration type particulate filter system of an embodiment according to the present invention.

This regeneration control method is performed according to the regeneration control flow as illustrated in FIG. 11. For the facility of the explanation, these illustrated flows are shown as flows to be called repeatedly and executed, in parallel with the control flow of the engine E.

In short, this flow is called repeatedly and executed after a certain time, in parallel during the operation control of the engine E and, when the control of the engine E is terminated, this flow will not be called no more, and this filter regeneration control terminates substantially.

In the regeneration control flow of the present invention, as shown in FIG. 11, in the step S10, the judgment of regeneration start is performed by checking the clogging of filter by PM accumulation estimated value PMs, and when this PM accumulation estimated value PMs exceeds a predetermined judgment value PMsmax, in the step S20, the filter with catalyst 3 is regenerated by the regeneration A mode operation or regeneration B mode operation.

First, when this regeneration flow starts, in step S10, the regeneration start is judged and in step S11, PM trap value PMt is computed. This PM trap value PMt is calculated from the difference between PM exhaust quantity and PM purification quantity computed from the map data of previously input PM exhaust map or others, based on torque Q and engine speed Ne showing the engine E operation state, DPF inlet exhaust gas temperature Te measured by DPF inlet exhaust gas temperature sensor 51, or others.

Or, PM deposit quantity PMt caught by the filter with catalyst 3 is computed from the comparison between DPF loss differential pressure detected by a DPF differential pressure sensor 52, and previously input DPF differential map.

Then, in the following step S12, PM accumulation estimated value PMs is computed by accumulation calculation considering the time of this PM deposit quantity PMt.

In the judgment of this step S13, the necessity or not to start the regeneration mode operation is judged based on the determination that the PM accumulation estimated value PMs exceeds or not a predetermined judgment value PMsmax. In this judgment, if it is judged necessary to start the regeneration mode operation, it proceeds to the regeneration mode operation of the step S20, and if it is judged unnecessary to start the regeneration mode operation, it returns as it is.

The regeneration mode operation of the step S20 is performed as follows.

First, in the step S21, DPF inlet exhaust gas temperature Te is checked, and it is judged if the temperature Te is superior or not to a predetermined exhaust gas temperature Te1.

In this step S21, if the DPF inlet exhaust gas temperature Te is a temperature inferior to the predetermined exhaust gas temperature Te1 (for instance, about 350° C.), namely, equal or inferior to a low temperature oxidation area, the regeneration A mode operation of the step S22 shall be performed.

In the present invention, as the exhaust gas temperature is risen by performing any one of the aforementioned fuel injection control (fuel injection control involving a multistage auxiliary injection in FIG. 11), during the regeneration A mode operation in this low temperature area, PM can be oxidized and eliminated.

Then, returning to the step S21, the step S22 and the step 21 are repeated until the DPF inlet exhaust gas temperature Te exceeds the predetermined exhaust gas temperature Te1.

In this step S21, in case where the DPF inlet exhaust gas temperature Te becomes higher than the predetermined exhaust gas temperature Te1, or in case where it is higher from the beginning, the regeneration B mode is performed in the step S23.

In this regeneration mode operation, PM is oxidized and eliminated, by a fuel injection control appropriate for respective temperature, because the exhaust gas temperature is equal or superior to the low temperature oxidation area (for instance, equal or superior to 400° C.), namely, equal or superior to a temperature where PM can be oxidized by oxidation catalyst, PM oxidation catalyst, or direct combustion.

And, in case where the exhaust gas temperature Te is in a low temperature oxidation temperature area (about 350° C. to 450° C.), NO is oxidized to $NO_2$ by an oxidation catalyst 32A, and PM can be oxidized and eliminated with this $NO_2$.

On the other hand, in case where the exhaust gas temperature Te is in a medium temperature oxidation area (about 400° C. to 600° C.), as PM can be oxidized and eliminated by $O_2$ in the exhaust gas, with PM oxidation catalyst, the engine operation is controlled to maintain the exhaust gas temperature to the medium temperature oxidation area or more, and PM caught in the filter with catalyst 3 is oxidized and eliminated by $O_2$ in the exhaust gas, with PM oxidation catalyst 32B.

Then, when the exhaust temperature Te is in a high temperature oxidation area (for instance, equal or superior to 600° C.), PM burns directly with $O_2$ in the exhaust gas.

There, this regeneration B mode operation is performed, and it is judged if the exhaust gas pressure Pe becomes or not smaller than the predetermined exhaust gas pressure value Pe1, to check if the filter regeneration has terminated or not.

In case where the filter regeneration has not terminated, it returns to the step S23 and the regeneration B mode operation is sustained, and in case where the filter regeneration has terminated, the regeneration mode operation is terminated and, in the step S25, the fuel injection is reset to the original injection mode, the PM accumulation estimated value PMs is reset (PMs=0), or other regeneration mode termination operation is completed, before return.

The use of the aforementioned regeneration control method permits the oxidation and elimination of PM caught and accumulated in the filter, by rising the exhaust gas temperature, through any one of the aforementioned fuel injection controls of the present invention such as fuel injection control involving a multistage auxiliary injection in the regeneration A mode operation or others, even if the filter regeneration comes to be required in an engine operation state at a low exhaust temperature, such as idling operation or extremely low load operation.

Further, the exhaust temperature can be risen keeping the engine speed and torque in the normal engine operation, so the engine torque variation can be controlled.

Figure 15:
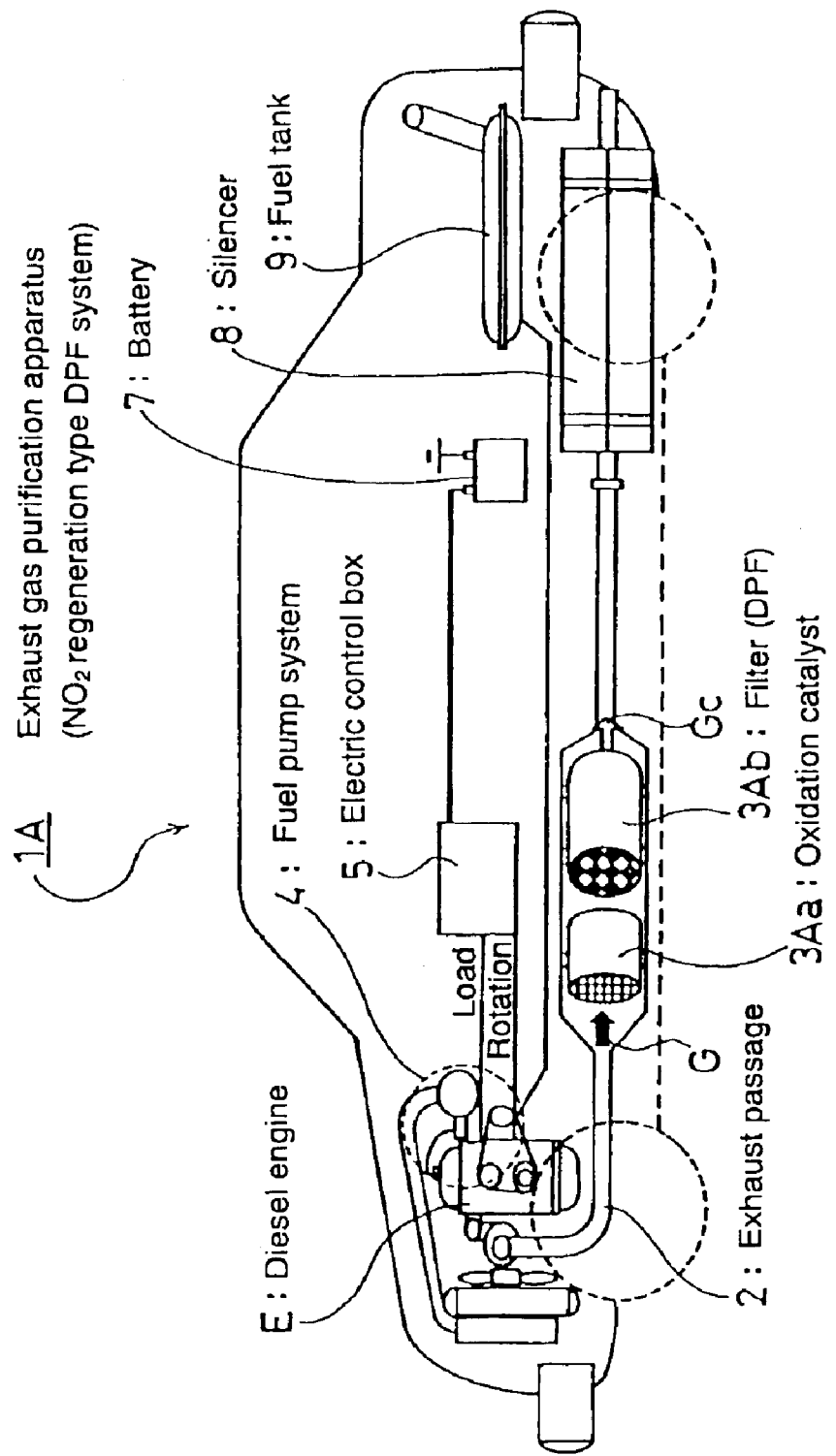
FIG. 15 is a composition diagram showing an example of a continuous regeneration type DPF system provided with oxidation catalyst of the prior art.
Figure 16:
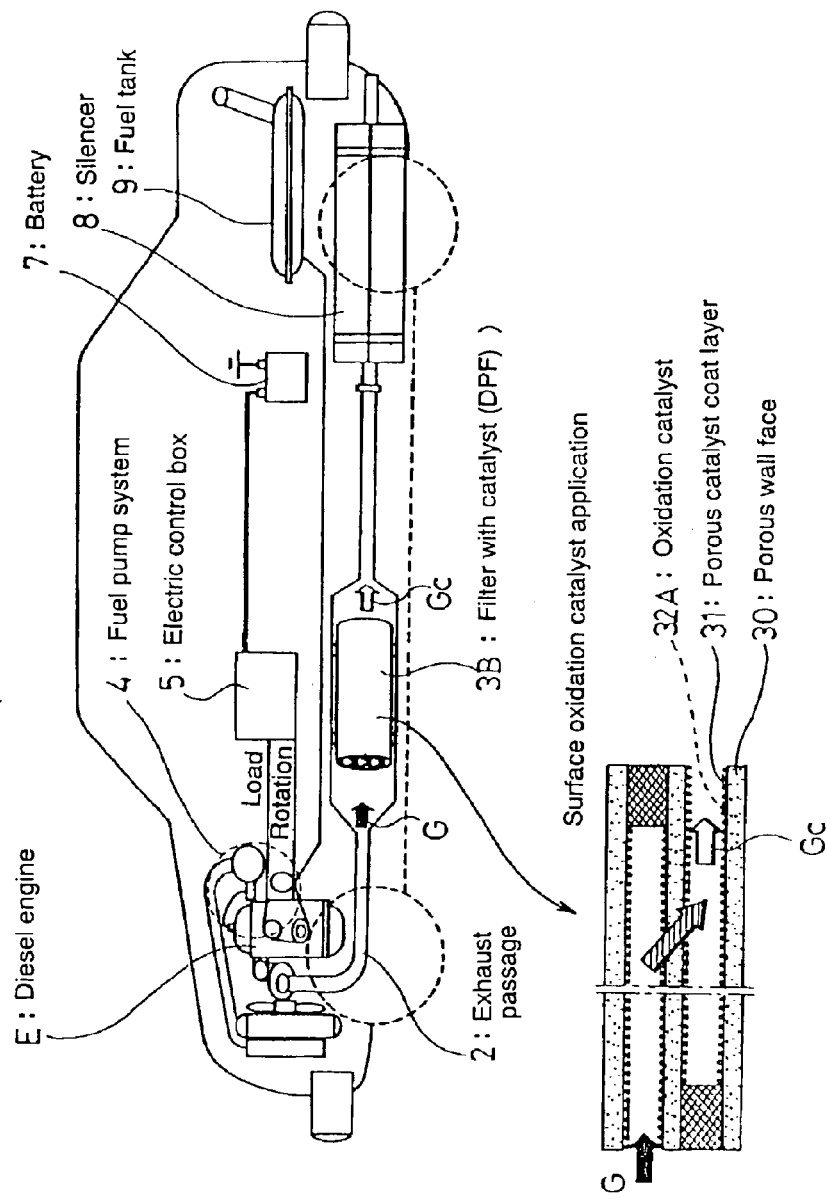
FIG. 16 is a composition diagram showing an example of a continuous regeneration type DPF system provided with a filter with oxidation catalyst of the prior art.
Figure 17:
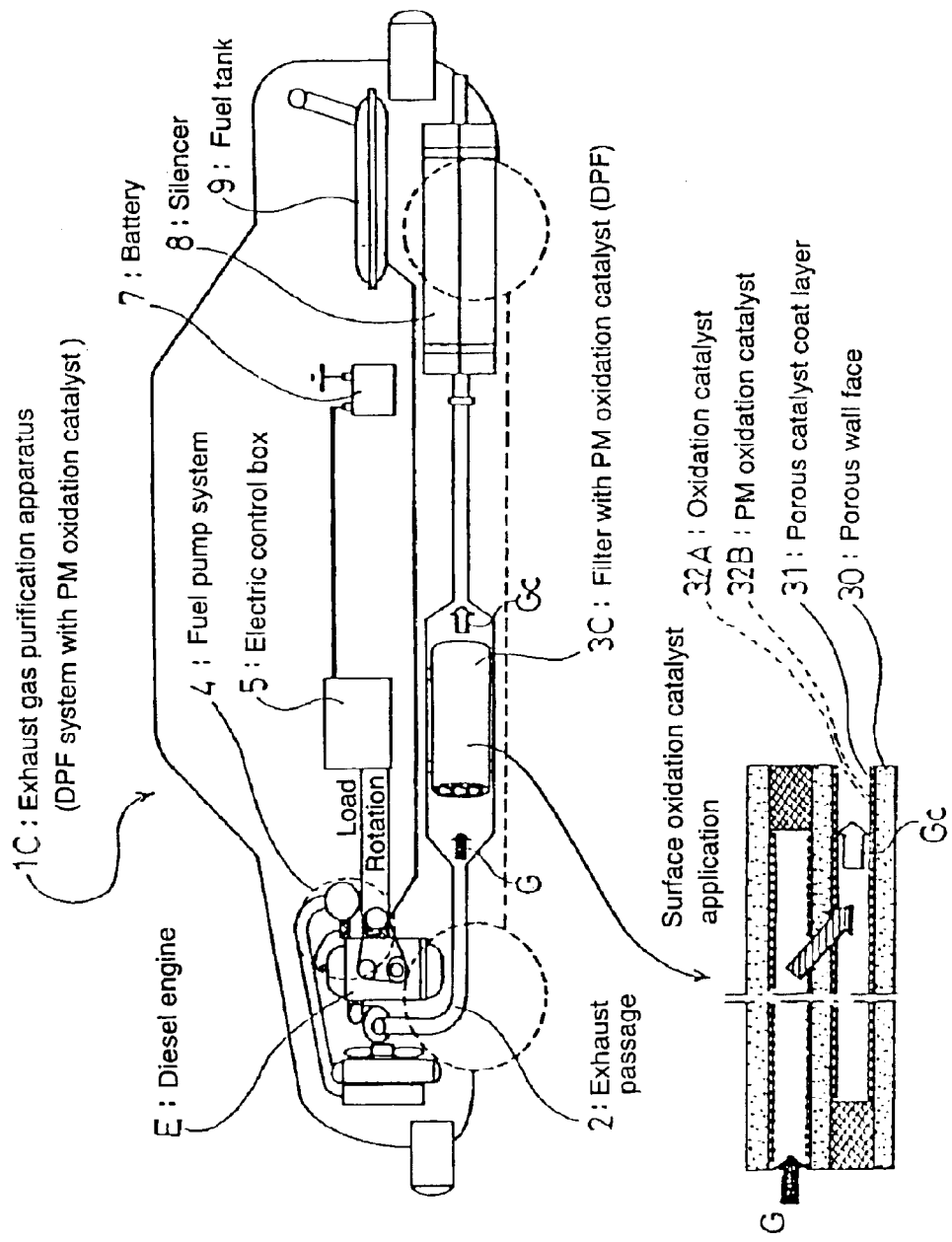
FIG. 17 is a composition diagram showing an example of a continuous regeneration type DPF system provided with a filter with PM oxidation catalyst of the prior art.

Though the continuous regeneration type DPF system shown in FIG. 9 is taken and described as an example of continuous regeneration type DPF system, the regeneration control method of the continuous regeneration type DPF system of the present invention can also be applied to the continuous regeneration type DPF system shown in FIG. 15 to FIG. 17, and the continuous regeneration type DPF system of the present invention is not limited to the continuous regeneration type DPF system shown in FIG. 9.

EXAMPLE

Figure 12:
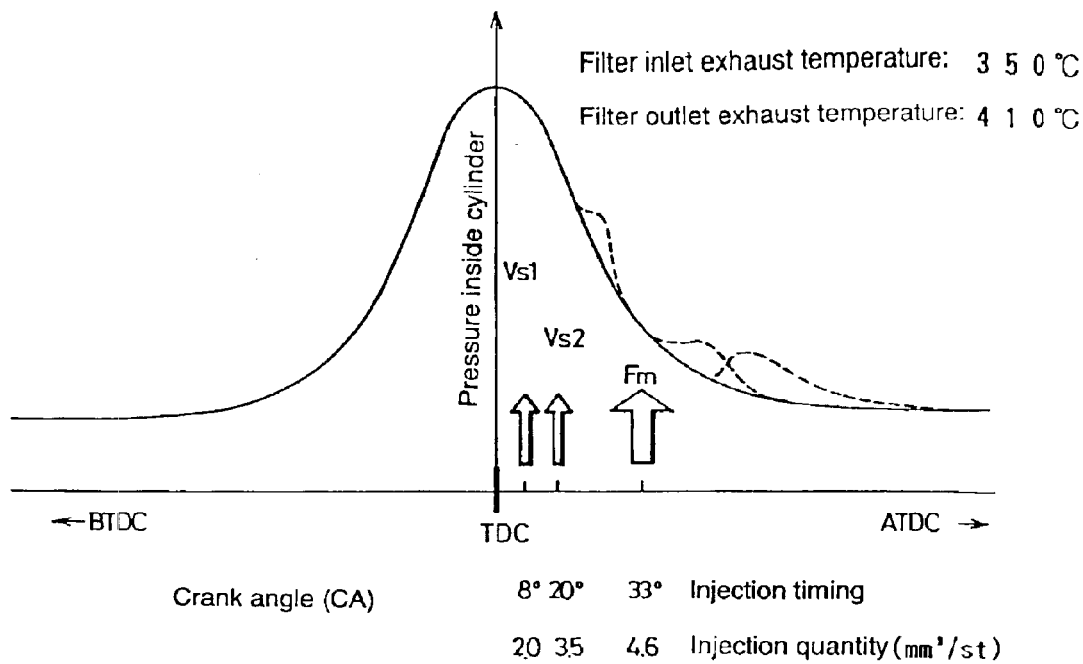
FIG. 12 is a diagram showing an example of fuel injection control with multistage auxiliary injection of fourth embodiment according to the present invention.
Figure 13:
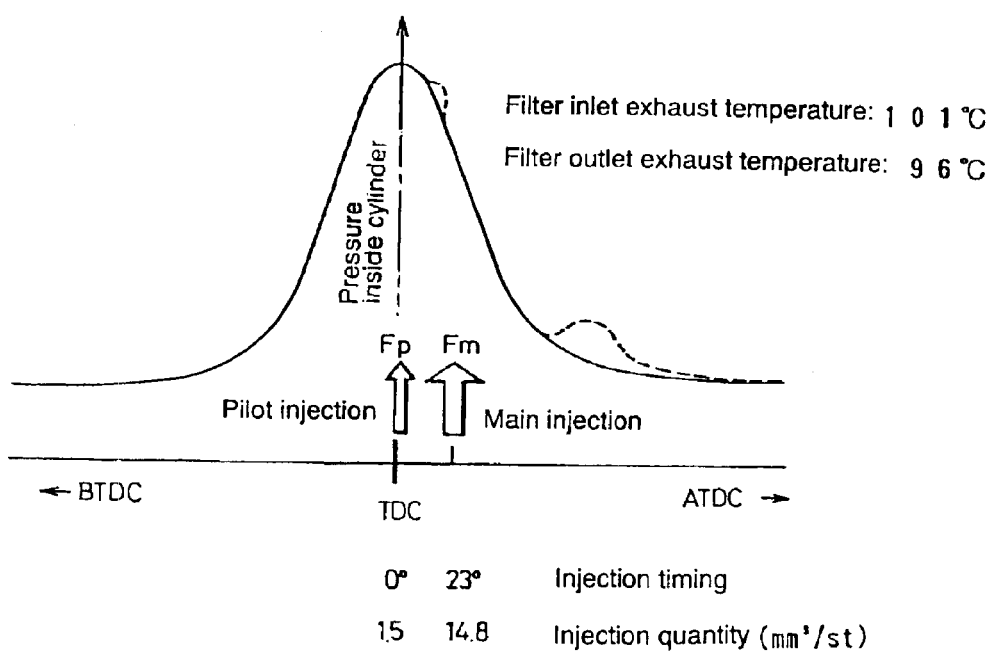
FIG. 13 is a diagram showing a comparative example of fuel injection control with pilot injection of the prior art.
Figure 14:
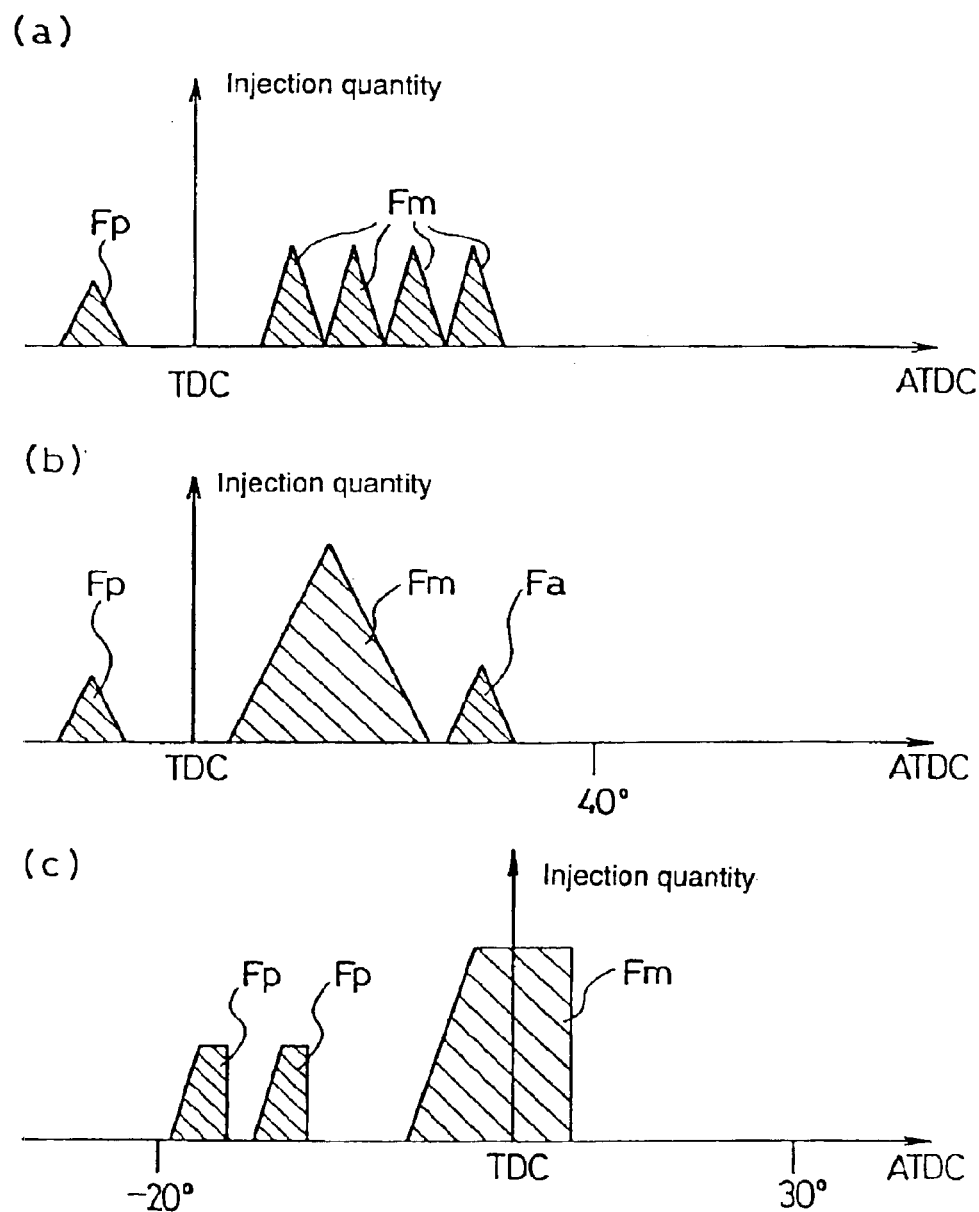
FIG. 14 is a diagram showing an example of fuel injection in the prior art, (a) shows an example of multistage injection, (b) shows an example of after injection, and (c) shows the pilot injection of the multistage injection mode.

An example of fuel injection control involving a multistage auxiliary injection of the fourth embodiment of the present invention is shown in FIG. 12, while a comparative example of fuel injection control involving a pilot injection of the prior art is shown in FIG. 13. It should be appreciated that the engine operation condition at that time, is 1,000 rpm in engine speed, under no load.

In the example of fuel injection control involving a multistage auxiliary injection shown in FIG. 12, the first auxiliary injection (injection quantity=2.0 $mm^3$/st) is performed at 8° ATDC, the second auxiliary injection (injection quantity=3.5 $mm^3$/st) at 20° ATDC, and the main injection (injection quantity=4.6 $mm^3$/st) at 33° ATDC, to obtain a inlet exhaust gas temperature of 350° C. and an exit exhaust gas temperature of 410° C. in the DPF apparatus.

On the other hand, in the comparative example of fuel injection control involving a pilot injection shown in FIG. 13, the pilot injection (1.5 $mm^3$/st) is performed at the top dead center (TDC) and the main injection (14.8 $mm^3$/st) at 23° ATDC, to obtain a inlet exhaust gas temperature of 101° C. and an exit exhaust gas temperature of 96° C.

Therefore, it can be known that the exhaust gas temperature can be risen by 200° C. or more compared to the case of fuel injection control involving a pilot injection, by adopting the fuel injection control involving a multistage auxiliary injection.

It should be appreciated that the ignitionability is still possible even when the first auxiliary injection timing (ts1) is set to 8° ATDC compared to the injection timing tp (0° ATDC) of the pilot injection, because the main injection can ignite and burn securely, by this plurality of auxiliary injection (Fsi) and, therefore, the temperature in the cylinder is high in the following cycle.

INDUSTRIAL APPLICABILITY

In the diesel engine fuel injection control of a vehicle or the like, while temporally controlling the fluctuation of the torque output, it is an object of the present invention to realize at least one of the rise of exhaust gas temperature and the reduction of oxygen concentration in the exhaust gas, by the fuel injection temporal control of the main injection/after injection, the main injection/sub and main after injection, the pilot injection/the main injection retard, the multistage auxiliary injection/main injection retard, or the like.

The regeneration control method of exhaust gas post-treatment apparatus using this fuel injection control can heat and activate oxidation catalyst or NOx catalyst, by rising the exhaust gas temperature, regenerate the filter by burning PM caught in the filter of a DPF apparatus for catching PM, or regenerate occlusion substance of NOx occlusion reduction type catalyst, by lowering the oxygen concentration in the exhaust gas, during the regeneration treatment in the exhaust gas post-treatment apparatus of a diesel engine.

Especially, in the continuous regeneration type DPF system, and while controlling the torque variation, it becomes possible to rise the exhaust gas temperature considerably, and regenerate the filter, even in an engine operation state at a low exhaust gas temperature, such as idling operation or extremely low load operation, making the filter clogging easily and making the filter regeneration difficult.

Consequently, the regeneration treatment of exhaust gas post-treatment apparatus for eliminating NOx, PM or others emitted from the diesel engine loaded on a vehicle such as automobile, lorry, or others can be performed efficiently, by controlling the deterioration of the fuel efficiency, without deteriorating the comfort of riding.

Therefore, it becomes possible to eliminate with a high purification rate NOx, PM or others emitted from an automobile, lorry, or others, and prevent from air pollution.

What is claimed is:

1. A diesel engine fuel injection control method for performing a pilot injection and a main injection by controlling the fuel injection of a diesel engine, and for performing at least one engine fuel combustion among retard of said main injection or increased/decreased of the injection quantity, for at least one of rising of diesel engine exhaust gas temperature and decrease of the oxygen concentration in the exhaust gas, wherein the injection quantity of said pilot injection is increased/decreased, in accordance with the increase/decrease at least one of retard amount and injection quantity of said main injection, wherein said injection quantity of said pilot injection is increased/decreased based on the output value of a fuel combustion state detection means, including an ion gap sensor, all the way monitoring the fuel combustion state in the cylinder by the fuel combustion state detection means, when at least one of said retard amount and said injection quantity of said main injection shall be increased/decreased.

2. The engine fuel injection control method of claim 1, wherein said injection quantity of said pilot injection is calculated in accordance with the relation between at least one quantity among said retard amount or said injection quantity of said main injection obtained previously and said injection quantity of said pilot injection, which is increased as the retard amount of the main injection is increased, and which is decreased as the injection quantity of the main injection is increased.

3. A diesel engine fuel injection control method to perform a pilot and a main injection, and at least one combustion of engine fuel during a retarding of said main injection or during an increase/decrease of the injection quantity, for a rising of diesel engine exhaust gas temperature or a decrease of the oxygen concentration in the exhaust gas, the method comprising:

increasing or decreasing the injection quantity of said pilot injection, in accordance with the increase or decrease of the retard amount or injection quantity of said main injection; and increasing or decreasing said injection quantity of said pilot injection based on the output value of a fuel combustion state detection means, including an ion gap sensor, which monitors the fuel combustion state in the cylinder, when at least one of said retard amount and said injection quantity of said main injection is increased or decreased.

* * * * *